(12) United States Patent
Liu et al.

(10) Patent No.: US 12,327,436 B2
(45) Date of Patent: Jun. 10, 2025

(54) CUSTOMIZED ELECTRICAL VEHICLE RANGE ESTIMATION SYSTEM BASED ON LOCATION AND DRIVER

(71) Applicant: TOYOTA MOTOR ENGINEERING & MANUFACTURING NORTH AMERICA, INC., Plano, TX (US)

(72) Inventors: Yongkang Liu, Mountain View, CA (US); Emrah Akin Sisbot, Mountain View, CA (US); Kentaro Oguchi, Mountain View, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 220 days.

(21) Appl. No.: 18/162,873

(22) Filed: Feb. 1, 2023

(65) Prior Publication Data
US 2024/0257575 A1    Aug. 1, 2024

(51) Int. Cl.
*G01C 21/34* (2006.01)
*G07C 5/00* (2006.01)

(52) U.S. Cl.
CPC ......... *G07C 5/004* (2013.01); *G01C 21/3469* (2013.01); *G07C 5/008* (2013.01)

(58) Field of Classification Search
CPC ..... G07C 5/004; G07C 5/008; G01C 21/3469
See application file for complete search history.

(56) References Cited

U.S. PATENT DOCUMENTS

| 10,160,340 B2 | 12/2018 | Lindemann | |
|---|---|---|---|
| 11,077,768 B2 | 8/2021 | Yang | |
| 2010/0138142 A1* | 6/2010 | Pease | B60W 50/0097 701/123 |
| 2017/0028912 A1* | 2/2017 | Yang | B60L 58/12 |

(Continued)

FOREIGN PATENT DOCUMENTS

| CN | 111216730 A | 6/2020 |
|---|---|---|
| DE | 102010003762 A1 | 10/2011 |
| WO | 2020020621 A1 | 1/2020 |

OTHER PUBLICATIONS

Kim et al., "A Machine Learning Method for EV Range Prediction with Updates on Route Information and Traffic Conditions," 36th AAAI Conference on Artificial Intelligence (AAAI-22), 36(11):12545-12551, Feb. 24, 2022 (https://doi.org/10.1609/aaai.v36i11.21525).

*Primary Examiner* — Anil K Bhargava
(74) *Attorney, Agent, or Firm* — SHEPPARD, MULLIN, RICHTER & HAMPTON LLP; Daniel N. Yannuzzi

(57) ABSTRACT

Systems and methods are provided for estimating the energy range of an electric vehicle, including updating an energy consumption estimation model based on the location of a vehicle or based on the current time. One embodiment comprises obtaining a route of a vehicle and deploying an energy consumption estimation model to provide an energy consumption estimate along the route from a first location to a destination. In response to determining that the vehicle enters a subsequent location, the energy consumption estimation model is updated with a location model received from an edge/cloud server, to estimate an energy range along the route through the subsequent location.

20 Claims, 15 Drawing Sheets

(56) References Cited

U.S. PATENT DOCUMENTS

| | | |
|---|---|---|
| 2019/0258251 A1 | 8/2019 | Ditty |
| 2020/0070679 A1* | 3/2020 | Wang ................ B60L 58/21 |
| 2020/0079223 A1 | 3/2020 | Puri |
| 2020/0166356 A1* | 5/2020 | Beaurepaire ......... B60L 58/12 |
| 2021/0146785 A1* | 5/2021 | Wang ................ G06N 20/00 |
| 2021/0231448 A1 | 7/2021 | Gerlitz |
| 2022/0203961 A1 | 6/2022 | Bhimani |

\* cited by examiner

1300

1302 → Encoding Segment

Learning common characters

1304 → Backbone Segment

Learning area characters

1306 → Decoding Segment

Learning driver characters

CUSTOMIZED ELECTRICAL VEHICLE RANGE ESTIMATION SYSTEM BASED ON LOCATION AND DRIVER

TECHNICAL FIELD

The present disclosure relates generally to systems and methods for estimating the energy range of an electric or hybrid electric vehicle. More particularly, some embodiments relate to estimating the energy consumption of an electric or hybrid electric vehicle needed to proceed along a given route in a particular location with a particular driver, including entering into geographical regions that the vehicle does not commonly enter, and determining whether the vehicle has enough remaining energy or state of charge (SOC) to complete the route.

DESCRIPTION OF RELATED ART

Vehicles including electric vehicles and hybrid electric vehicles typically have systems that perform energy range estimation or prediction. A vehicle may include a range estimating system configured to estimate a remaining driving range of a vehicle based on such factors as current battery state of charge (SOC), estimated current total vehicle weight, or other factors.

BRIEF SUMMARY OF THE DISCLOSURE

According to various embodiments of the disclosed technology, systems and methods for estimating the energy range of an electric or hybrid electric vehicle are provided. Some embodiments of the present disclosure are directed to updating an energy consumption estimation model based on the location of a vehicle or based on the current time.

In accordance with some embodiments, a system for estimating an energy range of a vehicle comprises a communication circuit configured to exchange communications between the system and an edge/cloud server, a memory storing instructions, and one or more processors communicably coupled to the memory. The one or more processors are configured to execute the instructions to obtain a route of the vehicle to be driven by a particular driver, and deploy an energy consumption estimation model that uses input data received from sensors connected to the vehicle to provide an energy consumption estimate along the route from a first location to a destination. The energy consumption estimation model is trained based on the input data, data relating to a driving style of the particular driver, and data obtained from the first location. In response to determining that the vehicle is to enter a subsequent location, the one or more processors are configured to execute the instructions to update the energy consumption estimation model with a location model received from the edge/cloud server, the location model being trained in a hierarchical learning framework using model parameters and historical data received at the edge/cloud server from connected vehicles to estimate an energy range along the route through the subsequent location. The one or more processors are further configured to execute the instructions to provide an output based on whether the estimated energy consumption is less than a current energy capacity.

In example embodiments the first location has been driven by the vehicle before and the subsequent location has not been driven by the vehicle before. The data obtained from the first location may be at least one of weather data, traffic data, or road geometry. The route of the vehicle to be driven by the particular driver may be obtained from an onboard navigation platform, or may be obtained from a prediction made based on history data of the particular driver including a common route driven by the particular driver.

In example embodiments, when the estimated energy consumption is greater than or equal to the current energy capacity, the output is at least one of (a) a recommendation to re-route the vehicle, (b) a recommended alternate route, (c) a recommended charging station, and (d) a recommended charging time. When the estimated energy consumption is less than the current energy capacity, the output is at least one of (a) a displayed segmented energy consumption map showing the estimated energy consumption along each segment of the map along the route, (b) energy saving driving tips, or (c) the remaining SOC/range after the route is complete.

In another example embodiment the one or more processors may be further configured to execute the instructions to (a) receive a generic range estimation model from the edge/cloud server, the generic range estimation model being trained using model parameters received from the connected vehicles, and (b) send model parameters to the generic range estimation model implemented in the edge/cloud server.

In another aspect, a system implemented in an edge/cloud server for energy range estimation of connected vehicles is provided, the system comprising a communication circuit configured to exchange communications between the system and connected vehicles, a memory storing instructions, and one or more processors communicably coupled to the memory. The one or more processors are configured to execute the instructions to receive model parameters from the connected vehicles and train one or more location models in a hierarchical learning framework using the received model parameters and historical data from the connected vehicles to estimate an energy range along a route in a predetermined location, each location model corresponding to a respective predetermined location. The one or more processors are further configured to execute the instructions to distribute a respective trained location model to at least one connected vehicle, the at least one connected vehicle proceeding along a route that travels through a respective predetermined location corresponding to the respective trained location model.

In some example embodiments the one or more processors are further configured to execute the instructions to train a generic range estimation model using the received model parameters from the connected vehicles, receive a request for the generic range estimation model from one or more connected vehicles, and distribute the generic range estimation model to each connected vehicle that sends the request.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
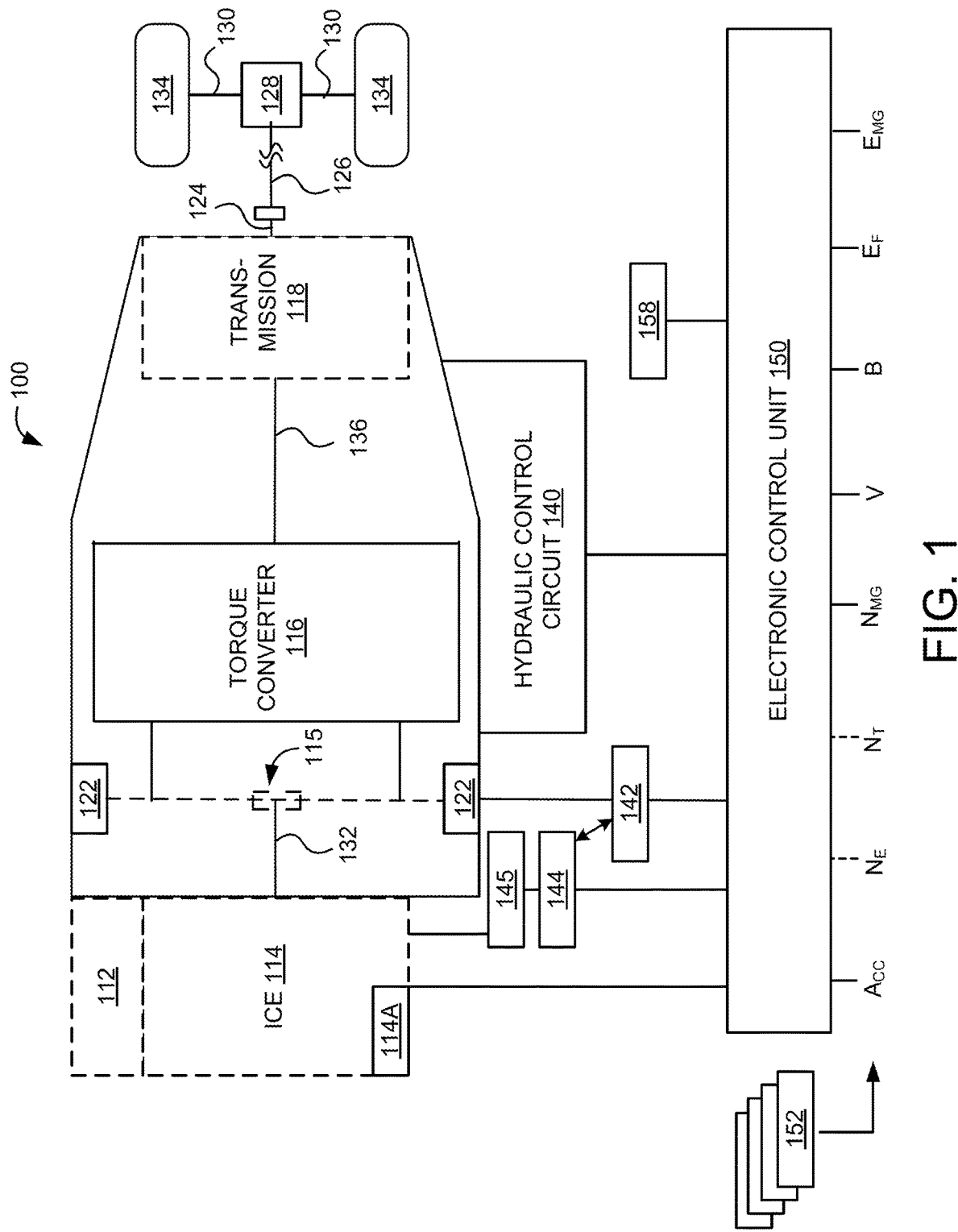
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

The present disclosure is directed to a customized range estimation system for electric or hybrid electric vehicles. In an example embodiment an onboard range estimation system includes an energy consumption estimation model that (1) estimates the needed energy consumption of an electric or hybrid electric vehicle along a particular route with a particular driver, and (2) determines whether the vehicle has enough remaining energy or state of charge (SOC) to complete the route.

Some example embodiments utilize a hierarchical learning framework in a cloud server, the hierarchical learning framework storing one or more location models that are trained to estimate energy consumption along a route in a predetermined region, each location model corresponding to a respective predetermined region. As the vehicle enters a new region, the energy consumption estimation model is updated with a respective location model from the cloud server corresponding to the location of the vehicle. The one or more location models are trained based on data obtained from connected vehicles that enter a respective predetermined region.

Some example embodiments utilize a hierarchical learning framework in a cloud server, the hierarchical learning framework storing one or more time-based models that are trained to estimate energy consumption along a route in a predetermined region, each time-based model corresponding to a respective predetermined time (such as time of day considering particular days of the week and holidays). As the vehicle enters a region at a particular time or in a particular time frame, the energy consumption estimation model is updated with a respective time-based model from the cloud server corresponding to the current time. The one or more time-based models are trained based on data obtained at respective predetermined times from connected vehicles that operate during that predetermined time.

Conventional systems for estimating range of an electric vehicle have been proposed. A typical driver model estimation, classification, and adaptation system for range prediction first classifies and matches observed driving behavior with known driving behaviors in the cloud, and then creates an adapted driver model based on the comparison for driving range calculation.

However, the existing technology is limited in a number of ways. For example, the range of an electrical vehicle can be affected by several factors. Although the driver model update may also consider traffic and environmental conditions, the update process is slow. If the driver drives from one location to a different location, prediction accuracy can drop because of the change in location-specific attributes. Similarly if the driver drives at a time of day or year that is uncommon to the driver or unfamiliar to the vehicle, prediction accuracy can drop because of the change in time-specific attributes. Moreover, the monitor—classification—matching process means that the cloud server needs to maintain a huge database in order to support the comparisons. Users also have significant privacy concerns because the cloud has their driving information. In addition, conventional processes classify the monitored driver behaviors each as one of conservative, neutral, or aggressive. However, in reality, driver behaviors tend to be far more complicated than just three types. Furthermore, the adapted driver model is not contributed to the cloud for a more accurate, more general model that can be used in the future.

Conventional systems also do not teach or suggest changing a current energy consumption estimation model to a new energy consumption estimation model trained based on data obtained from a certain area when a vehicle enters into the certain area, or based on data obtained during a certain time period when a vehicle is driving during the certain time period.

Technical solutions are realized throughout the disclosure. For example, different from the conventional solutions, example embodiments of the systems and methods disclosed herein can provide the following. As discussed above the disclosed technology can leverage a hierarchical learning framework located in a cloud server to improve range estimation accuracy. The hierarchical learning framework may correspond to a plurality of location models or time-based models as well as to a generic range estimation model stored in the cloud server.

A range estimation or energy consumption estimation model deployed on each vehicle is customized to the driving style, preferences, and common driving locations or times of a particular driver. If the vehicle is driving to another location, the server can update its onboard range estimation or energy consumption estimation model with a model from the hierarchical learning framework stored on the cloud server that is better suited for the new location via an over-the-air update. A similar onboard model update can occur based on time of day, time of week, time of year, etc.

Personalization or customization, i.e., customizing to a particular driver's preferences, style, behaviors (e.g., aggressive, neutral, or conservative driving) and common driving locations can be done in the vehicle's onboard range estimation or energy consumption estimation model by inputting into the vehicle's onboard model data from a particular driver. in examples a driver's privacy data does not leave his or her vehicle, thereby increasing security of private information. In examples, pre-defined classification and matching processes are not needed as well. Moreover, model parameters in each vehicle can be uploaded to servers in a cloud, where a generic range estimation model can be aggregated for future use such as distributing the generic range estimation model to new vehicles joining the system (e.g., a new vehicle that has not been driven before, or has not been driven by this driver before) or otherwise to connected vehicles.

Accordingly, the disclosed technology proposes a customized range estimation system for electric and hybrid electric vehicles. The onboard range estimation or energy consumption estimation model deployed on a given vehicle can be customized to a particular driver's driving style as well as to his or her common driving locations or times, so that the onboard range estimation or energy consumption estimation model can provide more accurate estimations. The on-board range estimation system, deployed on each vehicle, performs calculations based on input data. The hierarchical learning framework supports model deployment, customization, and updating as further described herein.

In an example embodiment a vehicle comprises a memory storing a first energy consumption estimation model trained based on data obtained from a first area, and a controller. The controller is programmed to, in response to determining that the vehicle enters a second area, estimate energy consumption based on input data and a second energy consumption estimation model trained based on data obtained from the second area. The control is further programmed to output a recommended action in response to determining that the estimated energy consumption is less than a current energy capacity.

In another example embodiment a vehicle comprises a memory storing a first energy consumption estimation model trained based on data obtained during a first period of time, and a controller. The controller is programmed to, in response to determining that a current time becomes within a second period of time, estimate energy consumption based on input data and a second energy consumption estimation model trained based on data obtained during the second period of time. The controller is further programmed to output a recommended action in response to determining that the estimated energy consumption is less than a current energy capacity.

As used herein, the words "geographic location," "location," "geographic position" and "position" refer to a latitude and longitude of an object (or, a latitude, longitude, and elevation of an object), such as a vehicle, a roadside equipment/unit, etc. As used herein, the words "geographic area", "area," and "region" refer to a physical space surrounding a geographic location and/or object (e.g., an area of defined space surrounding a geographic location or position).

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for range estimation can be implemented in other types of vehicles including electric vehicles, or other vehicles.

FIG. 1 illustrates a drive system of an example vehicle 100 that may include an internal combustion engine 114 and one or more electric motors 122 (which may also serve as generators) as sources of motive power. Driving force generated by the internal combustion engine 114 and motors 122 can be transmitted to one or more wheels 134 via a torque converter 116, a transmission 118, a differential gear device 128, and a pair of axles 130.

As an HEV, vehicle 100 may be driven/powered with either or both of engine 114 and the motor(s) 122 as the drive source for travel. For example, a first travel mode may be an engine-only travel mode that only uses internal combustion engine 114 as the source of motive power. A second travel mode may be an EV travel mode that only uses the motor(s) 122 as the source of motive power. A third travel mode may be an HEV travel mode that uses engine 114 and the motor(s) 122 as the sources of motive power. In the engine-only and HEV travel modes, vehicle 100 relies on the motive force generated at least by internal combustion engine 114, and a clutch 115 may be included to engage engine 114. In the EV travel mode, vehicle 100 is powered by the motive force generated by motor 122 while engine 114 may be stopped and clutch 115 disengaged.

Engine 114 can be an internal combustion engine such as a gasoline, diesel or similarly powered engine in which fuel is injected into and combusted in a combustion chamber. A cooling system 112 can be provided to cool the engine 114 such as, for example, by removing excess heat from engine 114. For example, cooling system 112 can be implemented to include a radiator, a water pump and a series of cooling channels. In operation, the water pump circulates coolant through the engine 114 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 114. In other applications, either or both the water pump and the fan may be operated by electric current such as from battery 144.

An output control circuit 114A may be provided to control drive (output torque) of engine 114. Output control circuit 114A may include a throttle actuator to control an electronic throttle valve that controls fuel injection, an ignition device that controls ignition timing, and the like. Output control circuit 114A may execute output control of engine 114 according to a command control signal(s) supplied from an electronic control unit 150, described below. Such output control can include, for example, throttle control, fuel injection control, and ignition timing control.

Motor 122 can also be used to provide motive power in vehicle 100 and is powered electrically via a battery 144. Battery 144 may be implemented as one or more batteries or other power storage devices including, for example, lead-acid batteries, nickel-metal hydride batteries, lithium ion batteries, capacitive storage devices, and so on. Battery 144 may be charged by a battery charger 145 that receives energy from internal combustion engine 114. For example, an alternator or generator may be coupled directly or indirectly to a drive shaft of internal combustion engine 114 to generate an electrical current as a result of the operation of internal combustion engine 114. A clutch can be included to engage/disengage the battery charger 145. Battery 144 may also be charged by motor 122 such as, for example, by regenerative braking or by coasting during which time motor 122 operate as generator.

Motor 122 can be powered by battery 144 to generate a motive force to move the vehicle and adjust vehicle speed. Motor 122 can also function as a generator to generate electrical power such as, for example, when coasting or braking. Battery 144 may also be used to power other electrical or electronic systems in the vehicle. Motor 122 may be connected to battery 144 via an inverter 142. Battery 144 can include, for example, one or more batteries, capacitive storage units, or other storage reservoirs suitable for storing electrical energy that can be used to power motor 122. When battery 144 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 150 (described below) may be included and may control the electric drive components of the vehicle as well as other vehicle components. For example, electronic control unit 150 may control inverter 142, adjust driving current supplied to motor 122, and adjust the current received from motor 122 during regenerative coasting and breaking. As a more particular example, output torque of the motor 122 can be increased or decreased by electronic control unit 150 through the inverter 142.

A torque converter 116 can be included to control the application of power from engine 114 and motor 122 to transmission 118. Torque converter 116 can include a viscous fluid coupling that transfers rotational power from the motive power source to the driveshaft via the transmission. Torque converter 116 can include a conventional torque converter or a lockup torque converter. In other embodiments, a mechanical clutch can be used in place of torque converter 116.

Clutch 115 can be included to engage and disengage engine 114 from the drivetrain of the vehicle. In the illustrated example, a crankshaft 132, which is an output member of engine 114, may be selectively coupled to the motor 122 and torque converter 116 via clutch 115. Clutch 115 can be implemented as, for example, a multiple disc type hydraulic frictional engagement device whose engagement is controlled by an actuator such as a hydraulic actuator. Clutch 115 may be controlled such that its engagement state is complete engagement, slip engagement, and complete disengagement complete disengagement, depending on the pressure applied to the clutch. For example, a torque capacity of clutch 115 may be controlled according to the hydraulic pressure supplied from a hydraulic control circuit 140. When clutch 115 is engaged, power transmission is provided in the power transmission path between the crankshaft 132 and torque converter 116. On the other hand, when clutch 115 is disengaged, motive power from engine 114 is not delivered to the torque converter 116. In a slip engagement state, clutch 115 is engaged, and motive power is provided to torque converter 116 according to a torque capacity (transmission torque) of the clutch 115.

As alluded to above, vehicle 100 may include an electronic control unit 150. Electronic control unit 150 may include circuitry to control various aspects of the vehicle operation. Electronic control unit 150 may include, for example, a microcomputer that includes a one or more processing units (e.g., microprocessors), memory storage (e.g., RAM, ROM, etc.), and I/O devices. The processing units of electronic control unit 150, execute instructions stored in memory to control one or more electrical systems or subsystems 158 in the vehicle. Electronic control unit 150 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 150 receives information from a plurality of sensors included in vehicle 100. For example, electronic control unit 150 may receive signals that indicate vehicle operating conditions or characteristics, or signals that can be used to derive vehicle operating conditions or characteristics. These may include, but are not limited to accelerator operation amount, ACC, a revolution speed, NE, of internal combustion engine 114 (engine RPM), a rotational speed, NMG, of the motor 122 (motor rotational speed), and vehicle speed, NV. These may also include torque converter 116 output, NT (e.g., output amps indicative of motor output), brake operation amount/pressure, B, or battery SOC (i.e., the charged amount for battery 144 detected by an SOC sensor). Accordingly, vehicle 100 can include a plurality of sensors 152 that can be used to detect various conditions internal or external to the vehicle and provide sensed conditions to engine control unit 150 (which, again, may be implemented as one or a plurality of individual control circuits). In one embodiment, sensors 152 may be included to detect one or more conditions directly or indirectly such as, for example, fuel efficiency, EF, motor efficiency, EMG, hybrid (internal combustion engine 114+MG 112) efficiency, acceleration, ACC, etc.

In some embodiments, one or more of the sensors 152 may include their own processing capability to compute the results for additional information that can be provided to electronic control unit 150. In other embodiments, one or more sensors may be data-gathering-only sensors that provide only raw data to electronic control unit 150. In further embodiments, hybrid sensors may be included that provide a combination of raw data and processed data to electronic control unit 150. Sensors 152 may provide an analog output or a digital output.

Sensors 152 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect objects in an environment surrounding vehicle 100, for example, traffic signs indicating a current speed limit, road curvature, obstacles, surrounding vehicles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
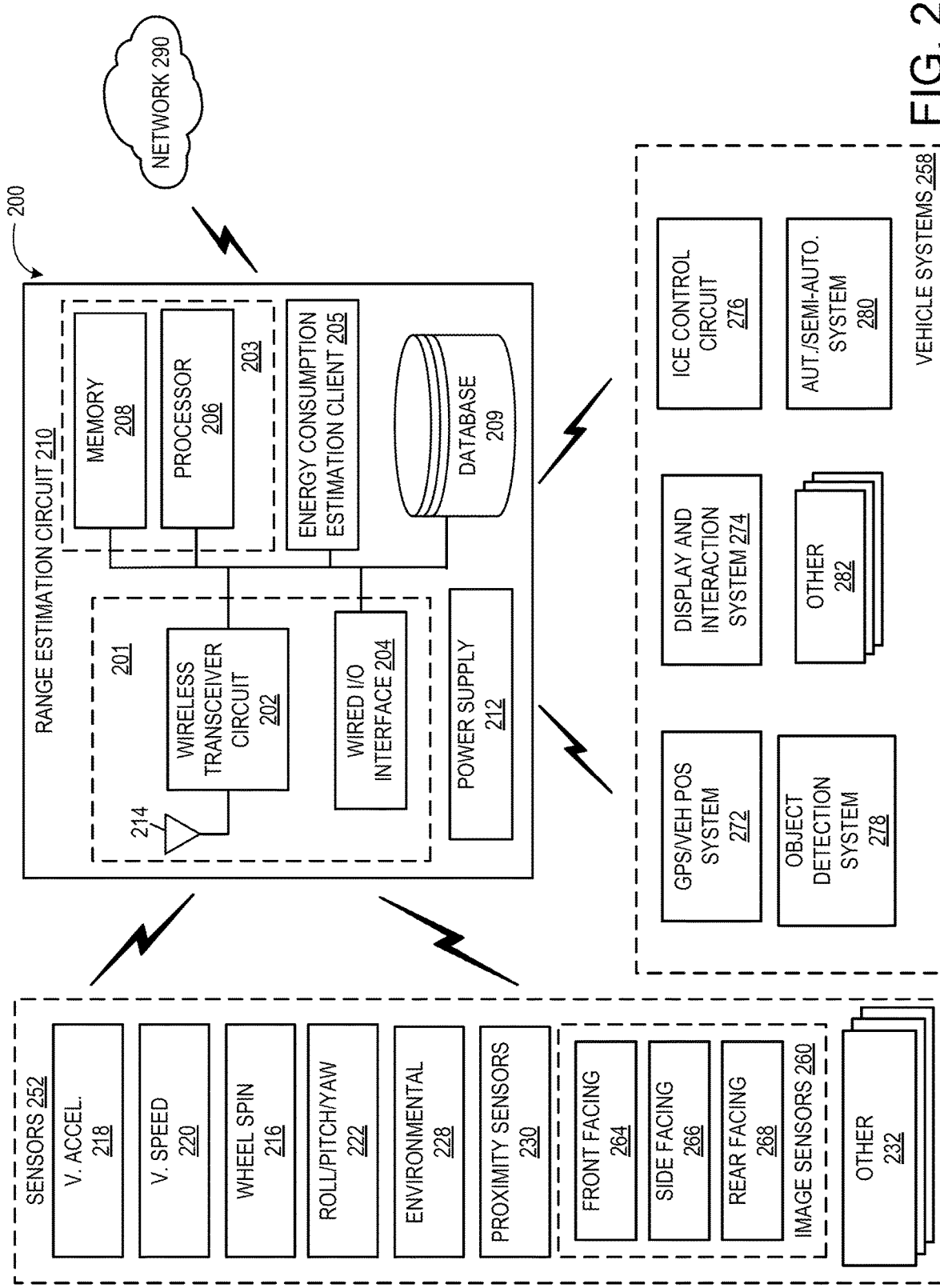
FIG. 2 illustrates an example architecture for estimating the range of an electric or hybrid electric vehicle in accordance with one embodiment of the systems and methods described herein.

FIG. 2 illustrates an example architecture for estimating the range of an electric or hybrid electric vehicle in accordance with one embodiment of the systems and methods described herein. Referring now to FIG. 2, in this example, range estimation system 200 includes a range estimation circuit 210, a plurality of sensors 252, and a plurality of vehicle systems 258. Sensors 252 (such as sensors 152 described in connection with FIG. 1) and vehicle systems 258 (such as systems 158 described in connection with FIG. 1) can communicate with range estimation circuit 210 via a wired or wireless communication interface. Although sensors 252 and vehicle systems 258 are depicted as communicating with range estimation circuit 210, they can also communicate with each other, as well as with other vehicle systems. Range estimation circuit 210 can be implemented as an ECU or as part of an ECU such as, for example electronic control unit 150. In other embodiments, range estimation circuit 210 can be implemented independently of the ECU.

Range estimation circuit 210 in this example embodiment includes a communication circuit 201, a decision circuit 203 (including a processor 206 and memory 208 in this example) and a power supply 212. Components of range estimation circuit 210 are illustrated as communicating with each other via a data bus, although other communication interfaces can be included. Range estimation circuit 210 in this example also includes energy consumption estimation client 205.

The energy consumption estimation client 205 includes an energy consumption estimation model. The energy estimation client 205 can be operated to, among other actions, estimate needed energy consumption of the vehicle 100 along a particular route, in some examples with a particular driver based on driver preferences, routes, etc. The energy estimation client 205 uses input data from sensors 252 and/or from vehicle systems 258.

The energy consumption estimation model in one example compares the estimated energy consumption along the route with the current energy capacity of the vehicle 100 and determines if the vehicle 100 has enough remaining energy or state of charge (SOC) to complete the route. The energy consumption estimation client 205 provides an output to the driver depending on the comparison performed by the energy consumption estimation model. If the vehicle 100 does not have enough remaining energy or state of charge (SOC) to complete the route then the energy consumption estimation client 205 can prompt the driver to re-route using an alternate route, considering charging. If the vehicle does have enough remaining energy or state of charge (SOC) to complete the route then the energy consumption estimation client 205 can (a) provide a segmented energy consumption map on a vehicle display (described in more detail below), (b) provide energy saving driving tips via a vehicle display or using audio, or (c) speak/display to the driver the remaining SOC/range. The energy consumption estimation client 205 can also recommend a charging station, charging time, and alternate route.

The energy consumption estimation client 205 can also communicate with an edge/cloud server such as server 310 via communication circuit 201 over the network 290 to perform, among other actions, one or more of the following: (a) receiving a generic range estimation model from the edge/cloud server via network 290, (b) receiving input data or one or more location models, time-based models, or other models from the edge/cloud server via network 290, and (c) updating the edge/cloud server with model parameters from vehicle 100.

Figure 6:
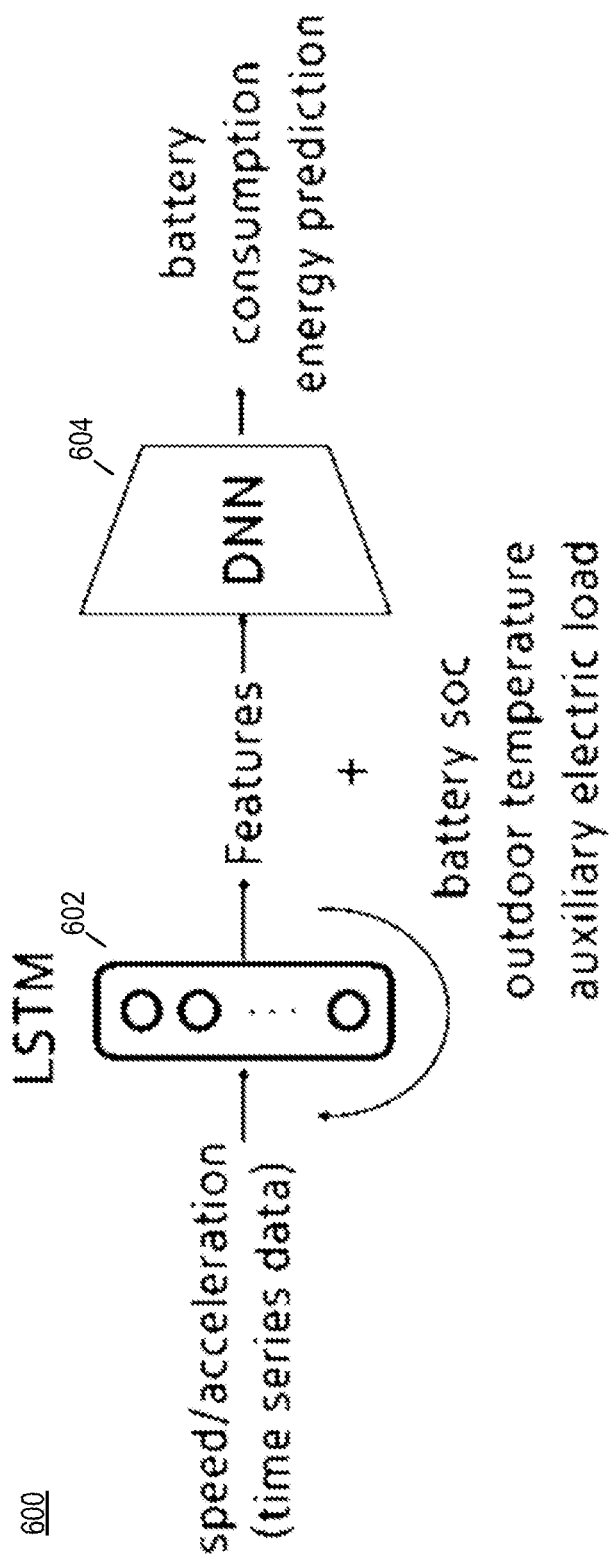
FIG. 6 shows an example model architecture of an energy consumption estimation model in accordance with various embodiments disclosed herein.

In example embodiments the energy consumption estimation model of the energy consumption estimation client 205 is a data driven machine learning-based model. In some example embodiments the model is based on deep neural networks (e.g., a recurrent neural network, a convolutional neural network, or a mixed structure) or on other machine learning models. FIG. 6 shows an example model architecture 600 of the energy consumption estimation model, although it is of course to be understood that the present disclosure is not limited to the specific network design shown therein. As shown in FIG. 6, inputs into Long Short-Term Memory (LSTM) 602 may include time series data such as speed, acceleration, or others. Inputs into Deep Neural Network (DNN) 604 may include battery SOC, outdoor temperature, auxiliary electric load, or others. The output of the DNN 604 may be a battery consumption energy prediction or a range or energy consumption estimate.

Returning to FIG. 2, processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store instructions and variables for processor 206 as well as any other suitable information, such as data relating to driving style, preferences, or common driving locations/times of a particular driver along with other data as needed. Memory 208 can be made up of one or more modules of one or more different types of memory, and may be configured to store data and other information as well as operational instructions that may be used by the processor 206 to range estimation circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up a range estimation circuit 210.

Communication circuit 201 includes either or both of a wireless transceiver circuit 202 with an associated antenna 214 and a wired I/O interface 204 with an associated hardwired data port (not illustrated). Communication circuit 201 can provide for V2X and/or V2V communications capabilities, allowing range estimation circuit 210 to communicate with edge devices, such as roadside unit/equipment (RSU/RSE), network cloud servers and cloud-based databases, and/or other vehicles via network 290. For example, V2X communication capabilities allows range estimation circuit 210 to communicate with edge/cloud devices, roadside infrastructure (e.g., such as roadside equipment/roadside unit, which may be a vehicle-to-infrastructure (V2I)-enabled street light or cameras, for example), etc. Range estimation circuit 210 may also communicate with other connected vehicles over vehicle-to-vehicle (V2V) communications.

As used herein, "connected vehicle" refers to a vehicle that is actively connected to edge devices, other vehicles, and/or a cloud server via a network through V2X, V2I, and/or V2V communications. An "unconnected vehicle" refers to a vehicle that is not actively connected. That is, for example, an unconnected vehicle may include communication circuitry capable of wireless communication (e.g., V2X, V2I, V2V, etc.), but for whatever reason is not actively connected to other vehicles and/or communication devices. For example, the capabilities may be disabled, unresponsive due to low signal quality, etc. Further, an unconnected vehicle, in some embodiments, may be incapable of such communication, for example, in a case where the vehicle does not have the hardware/software providing such capabilities installed therein.

As this example illustrates, communications with range estimation circuit 210 can include either or both wired and wireless communications circuits 201. Wireless transceiver circuit 202 can include a transmitter and a receiver (not shown) to allow wireless communications via any of a number of communication protocols such as, for example, Wi-Fi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by range estimation circuit 210 to/from other entities such as sensors 252 and vehicle systems 258.

Wired I/O interface 204 can include a transmitter and a receiver (not shown) for hardwired communications with other devices. For example, wired I/O interface 204 can provide a hardwired interface to other components, including sensors 252 and vehicle systems 258. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, and NiH2, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 252 can include, for example, sensors 152 such as those described above with reference to the example of FIG. 1. Sensors 252 can include additional sensors that may or may not otherwise be included on a standard vehicle with which the range estimation system 200 is implemented. In the illustrated example, sensors 252 include vehicle acceleration sensors 218, vehicle speed sensors 220, wheelspin sensors 216 (e.g., one for each wheel), accelerometers such as a 2-axis accelerometer 222 to detect roll, pitch and yaw of the vehicle, environmental sensors 228 (e.g., to detect salinity or other environmental conditions), and proximity sensor 230 (e.g., sonar, radar, lidar or other vehicle proximity sensors). Additional sensors 232 can also be included as may be appropriate for a given implementation of range estimation system 200. Additional sensors 232 may include one or more of: current state of charge (SOC); current location and destination (e.g., from an onboard navigation system); static route information (e.g., road type, slope, etc.); dynamic route information (e.g., traffic event, congestion, etc.); vehicle dynamics (e.g., gas, speed, etc.); vehicle states (e.g., HVAC setting, tire pressure, battery age, etc.); supplementary information (e.g., ambient temperature, etc.); or others.

The information from the sensors 152, 232, or 252 may be accessible by energy consumption estimation client 205 for inputting into the energy consumption estimation model to aid in training the energy consumption estimation model and in calculating an energy consumption estimation. In addition, driver-related information for a particular driver or drivers (e.g., driver preferences such as common driving routes or locations or time of day, or driver styles such as common speed or acceleration), or other information, can be stored in database 209 and accessible by energy consumption estimation client 205 for inputting into the energy consumption estimation model to aid in training the energy consumption estimation model and in calculating an energy consumption estimation. Accordingly driver-related information can aid in training a personalized energy consumption estimation model for a specific driver, the personalized energy consumption estimation model being part of or implemented by the energy consumption estimation client 205.

System 200 may be equipped with one or more image sensors 260. These may include front facing image sensors 264, side facing image sensors 266, and/or rear facing image sensors 268. Image sensors may capture information which may be used in detecting not only vehicle conditions but also detecting conditions external to the vehicle as well. Image sensors that might be used to detect external conditions can include, for example, cameras or other image sensors configured to capture data in the form of sequential image frames forming a video in the visible spectrum, near infrared (IR) spectrum, IR spectrum, ultra violet spectrum, etc. Image sensors 260 can be used to, for example, to detect objects in an environment surrounding a vehicle comprising range estimation system 200, for example, surrounding vehicles, roadway environment, road lanes, road curvature, obstacles, and so on. For example, a one or more image sensors 260 may capture images of surrounding vehicles in the surrounding environment. As another example, object detecting and recognition techniques may be used to detect objects and environmental conditions, such as, but not limited to, road conditions, surrounding vehicle behavior (e.g., driving behavior and the like), and the like. Additionally, sensors may estimate proximity between vehicles. For instance, the image sensors 260 may include cameras that may be used with and/or integrated with other proximity sensors 230 such as LIDAR sensors or any other sensors capable of capturing a distance. As used herein, a sensor set of a vehicle may refer to sensors 252.

Vehicle systems 258, for example, systems and subsystems 258 described above with reference to the example of FIG. 2, can include any of a number of different vehicle components or subsystems used to control or monitor various aspects of the vehicle and its performance. In this example, the vehicle systems 258 includes a vehicle positioning system 272; engine control circuits 276 to control the operation of engine (e.g. internal combustion engine 114 and/or motors 122); object detection system 278 to perform image processing such as object recognition and detection on images from image sensors 260; proximity estimation, for example, from image sensors 260 and/or proximity sensors, etc. for use in other vehicle systems; vehicle display and interaction system 274 (e.g., vehicle audio system for broadcasting notifications over one or more vehicle speakers), vehicle display system and/or the vehicle dashboard system); and other vehicle systems 282 (e.g., Advanced Driver-Assistance Systems (ADAS), autonomous or semi-autonomous driving systems 280, such as forward/rear collision detection and warning systems, pedestrian detection systems, autonomous or semi-autonomous driving systems, and the like).

The vehicle positioning system 272 can include a conventional global positioning system (GPS) and/or a DRSC-compliant GPS (Dedicated Short-Range Communication), either which can be utilized by the range estimation circuit 210 of the present disclosure. Range estimation circuit 210 may for example be installed on a DSRC-equipped vehicle (Dedicated Short-Range Communication). A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

Conventional GPS communication includes a GPS satellite in communication with a vehicle comprising a GPS tracking device. The GPS tracking device emits/receives a signal to/from the GPS satellite. For example, a GPS tracking device is installed into a vehicle. The GPS tracking device receives position data from the GPS tracking device. The position data gathered from the vehicle is stored in the tracking device. The position data is transmitted to the cloud server via a wireless network.

A conventional GPS provides positional information that describes a position of a vehicle with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by an Advanced Driver Assistance System (ADAS) of a modern vehicle require positioning information that describes the location of the vehicle with lane-level accuracy. In addition, the current standard for DSRC requires that the location of the vehicle be described with lane-level accuracy. Both a conventional GPS and a DSRC-compliant GPS, or other types of GPS systems, may be used with the disclosed technology.

The range estimation circuit 210 may communicate with the vehicle positioning system 272 (e.g., an onboard navigation platform) to determine the route of the vehicle to be driven by the particular driver. If the route to be driven by the driver cannot be obtained by the vehicle positioning system 272 then a predicted route may be obtained by energy consumption estimation client/model 205 from a prediction made based on history data of the particular driver stored in the database 209 including a common route driven by the particular driver or common/past locations frequented. For example, if it is a work day, the predicted route may include setting the office as the predicted destination. A predicted route can also be obtained from hierarchical learning framework 305 (FIG. 3) of the server 310 over the network 290 based on general historical driver data received from connected vehicles 320 and stored in database 315, wherein the HLF 305 can access/update generic range estimation model 305*a*, location model(s) 305*b*, time-based model(s) 305*c*, and other model(s) 305*d*.

Figure 12:
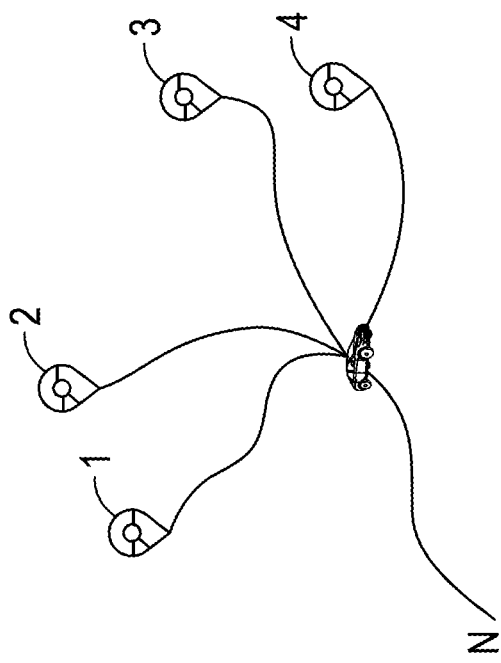
FIG. 12 shows a set of pseudo destinations that can be generated by selecting grids on a grid map or that can be predicted based on a driver's history in accordance with various embodiments disclosed herein.
Figure 12:
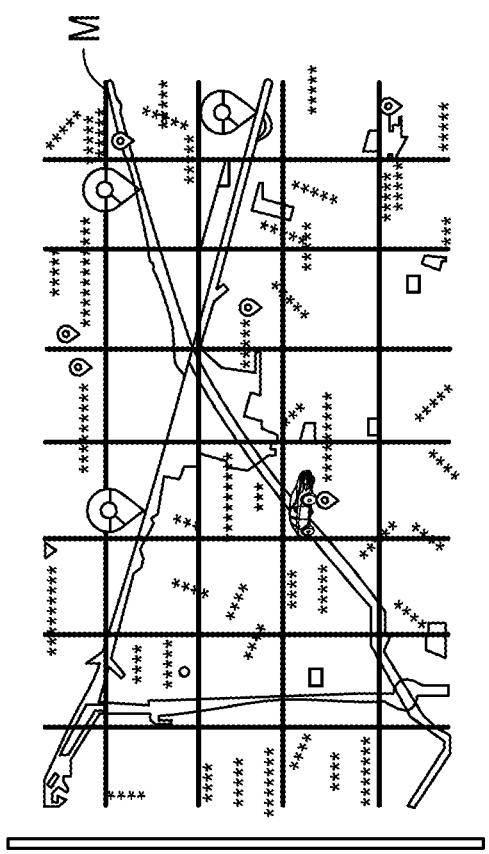

In more detail, in an example embodiment the energy consumption estimation model works from inputted data such as destination and driving route-related information. This information can be obtained if the driver is using an on-board navigation platform such as a GPS or vehicle positioning system 272. Alternately, if navigation is not used by the driver, a set of pseudo destinations can be predicted based on the driver's history data from vehicle systems 258 as stored in database 209, or based on general driver history data received from connected vehicles 320 and stored in the edge/cloud server 310 (e.g., stored in database 315), or generated by selecting possible grids on the grid map such as the grid map shown in FIG. 12. FIG. 12 shows a set of pseudo destinations 1, 2, 3, 4, . . . , N (as shown on the right side of the figure) that can be generated by selecting grids on the grid map M (as shown on the left side of the figure), or that can be predicted based on the driver's history if navigation is not used. In one example, the map can be divided into a number of grids and a set of grids can be randomly selected to yield a potential destination.

Returning to FIG. 2, network 290 may be a conventional type of network, wired or wireless, and may have numerous different configurations including a star configuration, token ring configuration, or other configurations. Furthermore, the network 290 may include a local area network (LAN), a wide area network (WAN) (e.g., the Internet), or other interconnected data paths across which multiple devices and/or entities may communicate. In some embodiments, the network may include a peer-to-peer network. The network may also be coupled to or may include portions of a telecommunications network for sending data in a variety of different communication protocols. In some embodiments, the network 290 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, Wi-Fi (infrastructure mode), Wi-Fi (ad-hoc mode), visible light communication, TV white space communication and satellite communication. The network may also include a mobile data network that may include 3G, 4G, 5G, LTE, LTE-V2V, LTE-V2I, LTE-V2X, LTE-D2D, VOLTE, 5G-V2X or any other mobile data network or combination of mobile data networks. Further, the network 290 may include one or more IEEE 802.11 wireless networks.

In some embodiments, the network 290 includes a V2X network (e.g., a V2X wireless network). The V2X network is a communication network that enables entities such as elements of the operating environment to wirelessly communicate with one another via one or more of the following: Wi-Fi; cellular communication including 3G, 4G, LTE, 5G, etc.; Dedicated Short Range Communication (DSRC); millimeter wave communication; etc. As described herein, examples of V2X communications include, but are not limited to, one or more of the following: Dedicated Short Range Communication (DSRC) (including Basic Safety Messages (BSMs) and Personal Safety Messages (PSMs), among other types of DSRC communication); Long-Term Evolution (LTE); millimeter wave (mmWave) communication; 3G; 4G; 5G; LTE-V2X; 5G-V2X; LTE-Vehicle-to-Vehicle (LTE-V2V); LTE-Device-to-Device (LTE-D2D); Voice over LTE (VOLTE); etc. In some examples, the V2X communications can include V2V communications, Vehicle-to-Infrastructure (V2I) communications, Vehicle-to-Network (V2N) communications or any combination thereof.

Examples of a wireless message (e.g., a V2X wireless message) described herein include, but are not limited to, the following messages: a Dedicated Short Range Communication (DSRC) message; a Basic Safety Message (BSM); a Long-Term Evolution (LTE) message; an LTE-V2X message (e.g., an LTE-Vehicle-to-Vehicle (LTE-V2V) message, an LTE-Vehicle-to-Infrastructure (LTE-V2I) message, an LTE-V2N message, etc.); a 5G-V2X message; and a millimeter wave message, etc.

According to some embodiments, energy consumption estimation client 205 includes code and routines that are operable, when executed by a processor 206, to cause the processor 206 to collect data captured from sensors 152, 232, 252 and/or vehicle system 258 (e.g., sensor data) and process the sensor data using an energy consumption estimation model to estimate the energy consumption required for a known or predicted route of a vehicle 100. Driver-related information for a particular driver or drivers (e.g., driver preferences such as common driving routes or locations or time of day, or driver styles such as common speed or acceleration) can be stored in database 209 and accessible by energy consumption estimation client 205, also for inputting into the energy consumption estimation model to aid in training the energy consumption estimation model and in calculating an energy consumption estimation.

In an example embodiment the energy consumption estimation model receives (a) a generic range estimation model from an edge/cloud server such as server 310, (b) input data such as from sensors 152, 232, or 252, (c) one or more location or time-based models from an edge/cloud server such as server 310, and (d) driver-related information or data (which may be from sensors) indicating driver preferences or style such as particular routes, roads, lanes, speed, time of day, time of year, weather conditions, etc., stored for example in database 209. The energy consumption estimation model receives such inputs and uses machine learning to estimate energy consumption along a known or predicted route. Model parameters from the energy consumption estimate model can be communicated from a vehicle 100, 320 to an edge/cloud server such as server 310 via communication circuit 201. Such model parameters are parameters of, e.g., a neural network that is used in the energy consumption estimation model, such as weights of each neural network layer. (The network can be for example a neural network in one non-limiting embodiment, but it is of course to be understood that other networks or machine learning models can be used as well.) As is known in the art, the parameters of a neural network are typically the weights of the connections, learned for example by optimizing a loss function. Such parameters are learned during the training stage. Therefore, the algorithm itself (and the input data) tunes these parameters. Hyperparameters, on the other hand, are those attributes of the learning process that are imposed on the model for the model to learn the parameters efficiently, such as, e.g., the learning rate, the batch size, or the number of epochs.

Communication circuit 201 can be used to transmit and receive information between range estimation circuit 210 and sensors 252 (or, even if not specifically stated, 152 or 232), and between range estimation circuit 210 and vehicle systems 258. Sensor data from sensors 252 and/or vehicle systems 258 is processed by energy consumption estimation client 205 to estimate needed energy consumption along a given route with a given driver.

The energy consumption estimation client 205, according to various embodiments, also includes code and routines that are operable, when executed by a processor 206, to cause the processor 206 to collect vehicle position data and/or current vehicle speed from sensors 252 and/or vehicle systems 258, which can be communicated to edge/cloud server via communication circuit 201.

The energy consumption estimate client 205 can receive a generic range estimation model 305a from the edge/cloud server 310 via communication circuit 201. The generic range estimation model 305a can update or replace the energy consumption estimation model used by the energy consumption estimation client 205. The generic range estimation model 305a can be trained using, for example, model parameters received from connected vehicles 320 and stored in a database 315 (in a non-limiting example the model parameters received from the connected vehicles can be aggregated using, for example, an average). An output of the energy consumption estimation client 205 or energy consumption estimation model can be communicated to vehicle systems 258 via communication circuit 201. Such output could be for example one or more of (a) a displayed segmented energy consumption map showing the estimated energy consumption along each segment of the map along the route, (b) energy saving driving tips, or (c) the remaining SOC/range after the route is complete. These can be displayed to the driver via a vehicle dashboard system display and/or speaker of interaction system 274 or delivered to the driver in another way, to notify the driver of the range or energy consumption estimation information.

Figure 3:
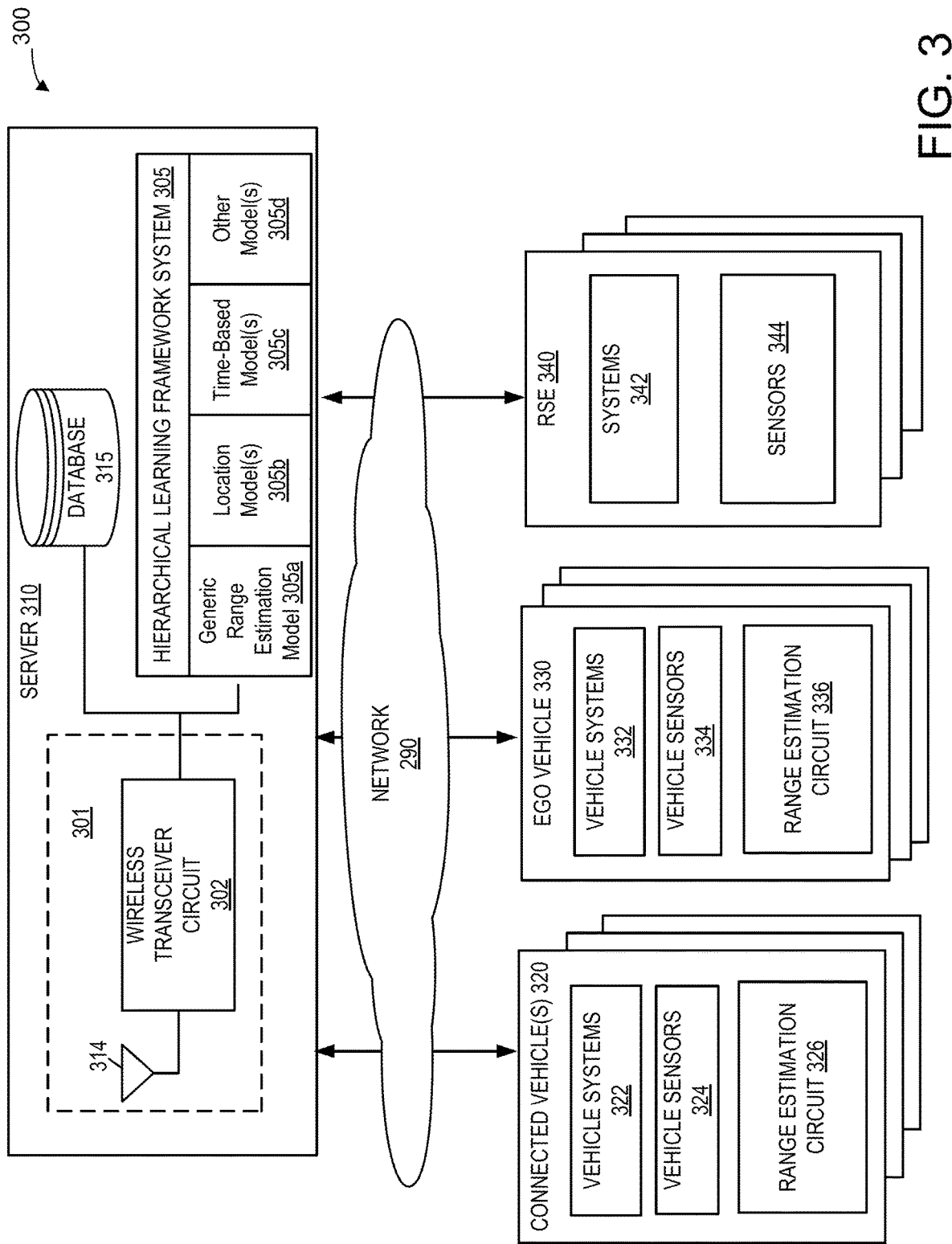
FIG. 3 is an example network architecture of a range estimation system in accordance with various embodiments disclosed herein.

FIG. 3 is an example network architecture 300 of a range estimation system 200 in accordance with various embodiments disclosed herein. The architecture 300 includes a server 310 comprising a hierarchical learning framework (HLF) 305 which is a system that includes a generic range estimation model 305a, location model(s) 305a, time-based model(s) 305c, and other model(s) 305d. The HLF system 305 in accordance with a non-limiting example embodiment is described in more detail below in connection with FIGS. 13 and 14.

In FIG. 3 the server 310 communicates with one or more connected vehicles 320 (collectively referred to as connected vehicles or vehicle 320), an ego vehicle 330, and one or more roadside equipment (RSE) 340 (one RSE is shown for illustrative purposes only). The server 310, connected vehicle 320, ego vehicle 330, and RSE 340 can all communicate with one another in this example, directly or through network 290. For example, connected vehicles 320 can communicate with the ego vehicle 330, and the ego vehicle 330 and/or connected vehicles 320 can communicate with the RSE 340.

Server 310 may be an edge server, a cloud server, or a combination of the foregoing. For example, server 310 may be an edge server implemented as a processor-based computing device installed in an RSE (e.g., RSE 340 or the like)

and/or some other processor-based infrastructure component of a roadway. A cloud server may be one or more cloud-based instances of processor-based computing device residents on network 290. Server 310 in this example includes a communication circuit 301.

The HLF system 305 comprises code and routines that, when executed by a processor cause the processor to (a) train a generic range estimation model 305a using model parameters received from the connected vehicles 320 (stored for example in database 315), (b) receive a request for the generic range estimation model 305a from one or more connected vehicles 320, and (c) distribute the generic range estimation model to each connected vehicle 320 that sends the request (or to a new connected vehicle 320). In some embodiments when training a generic model, the edge/cloud server may use historical data stored in a database such as database 315. However, in other embodiments when training a generic model the edge/cloud server is not necessarily using historical data. Rather, the edge/cloud server (as implemented for example by the HLF system 305) can aggregate all model parameters that the server receives from all vehicles connected to the server (stored for example in a database such as database 315). For example, if the server has ten vehicles connected to it, and the server has received ten different sets of model parameters, then to get a generic model the server can simply take an average of those ten sets of model parameters. Of course there are many different ways to do the aggregation, and taking an average is just an example, although it is a preferred way because it is relatively simple.

The HLF system 305 also comprises code and routines that, when executed by a processor cause the processor to receive model parameters from the connected vehicles 320 and train one or more location models 305b in a hierarchical learning framework using the received model parameters and historical data from the connected vehicles 320 (which may be stored in database 315) to estimate an energy range along a route in a predetermined location, each location model corresponding to a respective predetermined location. The predetermined location may be a city, state, geographical region, area code, or others, and may represent a location that has not been driven by the vehicle/driver before.

Figure 4:
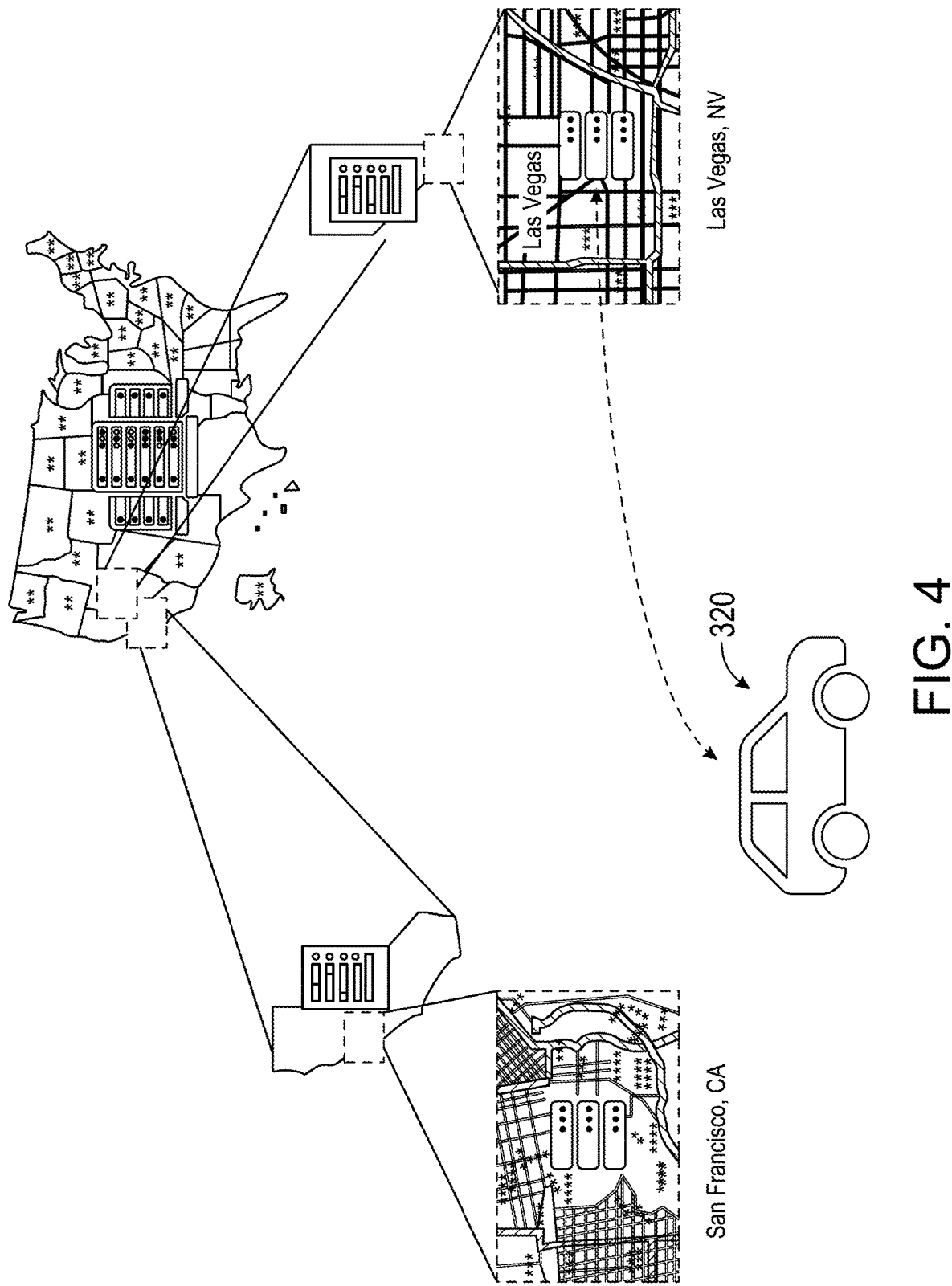
FIG. 4 shows an example of updating an onboard energy consumption estimation model in accordance with various embodiments disclosed herein.

In an example embodiment the hierarchical learning framework of HLF system 305 is a multi-level, multi-sever framework designed to support machine learning model deployment, customization, and updating. Each level sever covers a different scale of locations and is responsible for the model aggregation and updating for its location. FIG. 4 shows an example of updating an energy consumption estimation model of energy consumption estimation client 205 onboard a connected vehicle 320, by the HLF system 305. For this example assume that the vehicle has only been driven in the San Francisco area before, and so the energy consumption estimation model is optimized for the San Francisco area. If the driver decides to drive to the Las Vegas area, the model may not be able to provide an optimal or best estimation because of the differences between the two areas (e.g., differences in road geometry—hills vs. flat—or temperature, etc.). Therefore, along the way, the vehicle 100 can pull or download the model (e.g., a location model 305b) which is optimized for the Las Vegas area from the edge/cloud server 310 to update its own model (e.g., the energy consumption estimation model of the energy consumption estimation client 305). Accordingly common characteristics from the same area (or, in other embodiments, from within the same time period) can be used to provide better range or energy consumption estimates. For example, for each city/region/area/location/etc., data can be collected from connected vehicles 320 and used to train a model that is more specifically directed to the particular city/region/area/location/etc. Although in this example the hierarchy is constructed by regions, other constructions can be made as well, such as time hierarchy (e.g., a time-based model 305c) or others 305d.

The server 310 may distribute a respective trained location model 305b to one or more connected vehicles 320, the connected vehicle 320 proceeding along a route that travels through a respective predetermined location corresponding to the respective trained location model.

The HLF system 305 also comprises code and routines that, when executed by a processor cause the processor to receive model parameters from the connected vehicles 320 and train one or more time-based models 305c in a hierarchical learning framework using the received model parameters and historical data from the connected vehicles (stored for example in database 315) to estimate an energy range along a route that is within a predetermined time period, each time-based model 305c corresponding to a respective predetermined time period, and distribute a respective trained time-based model 305c to at least one connected vehicle 320. The at least one connected vehicle 320 is proceeding along a known or predicted route that is within the respective predetermined time period corresponding to the respective trained time-based model. Accordingly, in response to determining that a first or current time period becomes a second or subsequent time period (e.g., the predetermined time period), the respective trained time-based model 305c corresponding to the subsequent time period can be distributed to the connected vehicle 320. The predetermined time period may correspond for example to a time of day, time of year, specific day, weekday, or holiday.

Server 310 may include, for example, a microcomputer that includes a one or more processing units (e.g., microprocessors), memory storage (e.g., RAM, ROM, etc.), and I/O devices. The server 310 may store information and data related to range or energy consumption estimation in a cloud-based database 315, which may be resident on network 290. The database 315 may include one or more various forms of memory or data storage (e.g., flash, RAM, etc.) that may be used to store suitable information, such as one or more of the following: driver history data from connected vehicles 320 related to common routes in various predetermined regions or locations; common speeds; position data; past energy consumption; model parameters from connected vehicles 320; etc. Other data may be stored as needed. The processing units of cloud server 310 execute instructions stored in memory to execute and control functions of the range estimation.

Communication circuit 301 includes either or both of a wireless transceiver circuit 302 with an associated antenna 314 and a wired I/O interface with an associated hardwired data port (not illustrated). Communication circuit 201 can provide for V2X communication capabilities, server 310 to communicate with connected devices, such as RSE, edge devices, and/or vehicles via network 290.

Ego vehicles 330 and connected vehicles 320 may each provide similar functionality, and as such ego vehicle may be considered a connected vehicle but for explanation purposes is referred to as the "ego vehicle." Ego vehicles 330 and connected vehicles 320 may be any type of vehicle, for example, but not limited to, a car; a truck; a sports utility vehicle; a bus; a semi-truck; a drone or any other roadway-based conveyance. Ego vehicles 330 and/or connected vehicles 320 may be implemented as vehicle 100 of FIG. 1.

As such, ego vehicle 330 can comprises vehicle systems 332 and vehicle sensors 334 that are substantially similar to vehicle systems 258 and sensors 252 of FIG. 2. Ego vehicle 330 also includes range estimation circuit 336, which may be substantially similar to range estimation circuit 210 of FIG. 2. Similarly, connected vehicle 320 comprises vehicle systems 322 and vehicle sensors 324 that are substantially similar to vehicle systems 258 and sensors 252 of FIG. 2, along with range estimation circuit 326 that is substantially similar to range estimation circuit 210 of FIG. 2.

Ego vehicle 330 (and/or connected vehicle 320) may have V2X communication capabilities, allowing vehicles to communicate with edge devices, roadside infrastructure (e.g., such as RSE 340, which may be a vehicle-to-infrastructure (V2I)-enabled street light and/or cameras, for example). Vehicle 330 (or vehicles 320) may also communicate with other vehicles 320 over vehicle-to-vehicle (V2V) communications. It should be understood that sometimes, a vehicle itself may act as a network node, edge computing device, or a combination thereof. For example, vehicle 330 may operate as a network edge device. The data gathered by vehicles 330 (or vehicles 320), either through their own sensors, and/or other data sources, e.g., RSE 340 and other vehicles, may be ultimately be transmitted to the server 310. Furthermore, in some embodiments, a vehicle itself may act as a edge server.

The RSE 340 includes systems 342 and sensors 344. The RSE 340 can be implemented, for example, as a computing component. The sensors 344 may be similar to sensors 252, for example, comprising environmental sensors 228 (e.g., to detect salinity and/or other environmental conditions), proximity sensor 230 (e.g., sonar, radar, lidar and/or other vehicle proximity sensors), and image sensors 260 the like for capturing data of an environment surrounding the RSE 340. Systems 342 may include, for example, object detection system 278 to perform image processing such as object recognition and detection on images from image sensors 260, proximity estimation, for example, from image sensors 260 and/or proximity sensors, etc. The RSE 340 may also have known geographic coordinates and/or comprises a GPS unit of its own. In various embodiments, the range estimation system 200 of FIG. 2 and/or the server 310 of FIG. 3 receive data from sensors 344. The data can be stored in database 209 and/or database 315 and used by the energy consumption estimation client 205 or the HLF system 305.

Figure 5:
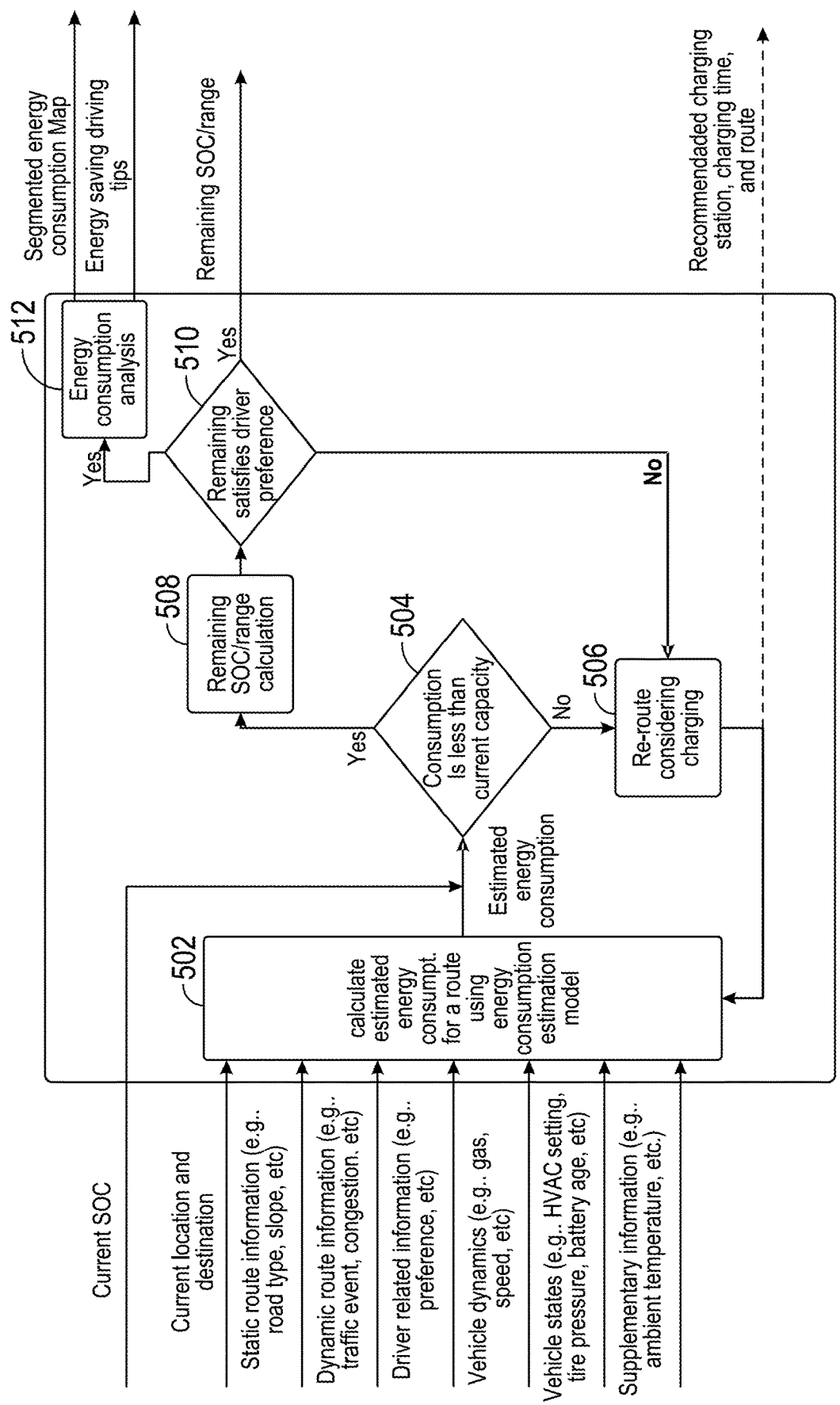
FIG. 5 is a schematic diagram illustrating processes of an onboard range estimation system in accordance with various embodiments disclosed herein.

FIG. 5 is a schematic diagram illustrating processes of an onboard range estimation system 500 which may be similar to onboard range estimation system 200 of vehicle 100. The processes or operations may be performed, e.g., by an energy consumption estimation engine or model (which may be similar to the energy consumption estimation model of energy consumption estimation client 205).

At operation 502 an estimated energy consumption required for a route or trip is calculated using an estimated energy consumption model of estimated energy consumption client 205, based on input information such as from sensors 152, 232, 252. Sensor information may include one or more of the following: current state of charge (SOC); current location and destination; static route information (e.g., road type, slope, etc.); dynamic route information (e.g., traffic event, congestion, etc.); vehicle dynamics (e.g., gas, speed, acceleration, etc.); vehicle states (e.g., HVAC setting, tire pressure, battery age/state, etc.); supplementary information (e.g., ambient temperature, etc.); or others. Other inputs may include one or more of the following: preview dynamics information to be received by communication (e.g., weather conditions, road conditions, etc.); and driver information that may be stored, e.g., in database 209, such as driver preference, styles, common routes, common locations, common times of day/week/year, common speeds or accelerations or weather/driving conditions, etc.). The energy consumption estimation model of the energy consumption estimation client 205 is trained using such inputs and the model attempts to determine which inputs have the most, or at least a significant, impact on energy consumption.

As noted above the energy consumption estimate client 205 can receive a generic range estimation model 305a from the edge/cloud server 310 via communication circuit 201. The generic range estimation model 305a can update or replace the energy consumption estimation model used by the energy consumption estimation client 205. The generic range estimation model 305a can use model parameters received from connected vehicles 320 (or in some examples historical driver data) stored in a database 315. The server 310 may distribute a respective trained location model 305b to one or more connected vehicles 320, the connected vehicle 320 proceeding along a route that travels through a respective predetermined location corresponding to the respective trained location model 305b. The server 310 may also distribute a respective trained time-based model 305c to one or more connected vehicles 320, the connected vehicle 320 proceeding along a route that travels through a respective predetermined time corresponding to the respective trained time-based model 305c. The server 310 may distribute other trained models 305d as well.

At operation 504 a comparison is made to determine whether the estimated energy consumption value needed to complete the route is less than the current or remaining energy capacity of the vehicle 100. If NO that means that the current or remaining energy capacity of the vehicle 100 is not enough to complete the route and reach the desired destination, and therefore at operation 506 the driver is prompted to re-route the vehicle considering charging, at which time the driver can be provided with recommended charging station(s), charging time, and route. If YES that means that the current or remaining energy capacity of the vehicle 100 is indeed sufficient to compete the route and therefore at operation 508 another remaining SOC/range calculation is performed. One reason that operation 508 is performed is because the vehicle 100 may be in motion utilizing energy or charge and so a dynamic computation of the remaining SOC/charge in real time can improve accuracy of the range estimation system 200. Accordingly in embodiments the process of FIG. 5 can run repeatedly or continuously to improve accuracy. Further, in more detail regarding operation 508, in an example embodiment this operation is simply a conversion: the estimated energy consumption number/value could use a unit of power (e.g., KW), but what can be displayed to the driver is a percentile number of remaining SOC, or a distance number in miles/km or others, etc. Thus in example embodiments operation 508 is to convert from different units. However, this is just one example design and in other examples the energy consumption estimation model can be designed to directly output a percentile number or distance number so that the conversion is unnecessary. It is of course to be understood that the disclosed technology is not limited to these examples.

At operation 510 it is determined whether the remaining SOC/range is sufficient to complete the route while satisfying a driver preference such as acceptable risk. For example, if the predicted remaining SOC is 10% (or will be 10% after the route is completed), some drivers may think that the predicted remaining SOC is enough to satisfy their personal risk tolerance or comfort level and start the route; but some drivers may think the predicted remaining SOC is not enough and thus prefer charging during the trip. If NO (it is determined that driver preference of acceptable risk is not satisfied) then the flow returns to operation 506 and the driver is prompted to re-route the vehicle considering charging, in which case recommended charging station(s), charging time, and an alternate route that satisfies the current state of charge can be presented. If YES (it is determined that driver preference of acceptable risk is satisfied) then at operation 512 an energy consumption analysis is performed to (a) present a segmented energy consumption map to the driver using display and interaction system 274, (b) provide the driver with energy saving tips (such as, in one non-limiting example, suggesting to the driver to keep the vehicle in an optimal cruising speed), and (c) communicate to the driver (via display, audio, or other) the remaining SOC/range. It is noted that in example embodiments operation 512 may be optional, i.e., operation 512 is performed if for example a driver wants to see one or more of these outputs; the operation can be turned off if the driver does not wish to see any of these outputs (or the operation can be customized to only those outputs the driver wishes to see).

The segmented energy consumption map can provide the driver with an overview of the energy consumption across the whole trip or route, thereby enabling the driver to have an understanding of which part(s) of the trip require more energy. As one non-limiting example, the segmented energy consumption map can show (e.g., in a red color) which parts of the route are consuming more energy, or can show (e.g., in a green color) which parts of the route are consuming less energy, or can show (e.g., in a gray color) which parts of the route have moderate energy consumption, etc. The energy saving tips can enable the driver to achieve more efficient driving. The remaining battery SOC/range after reaching the destination can be displayed or otherwise communicated to the driver.

Figure 7:
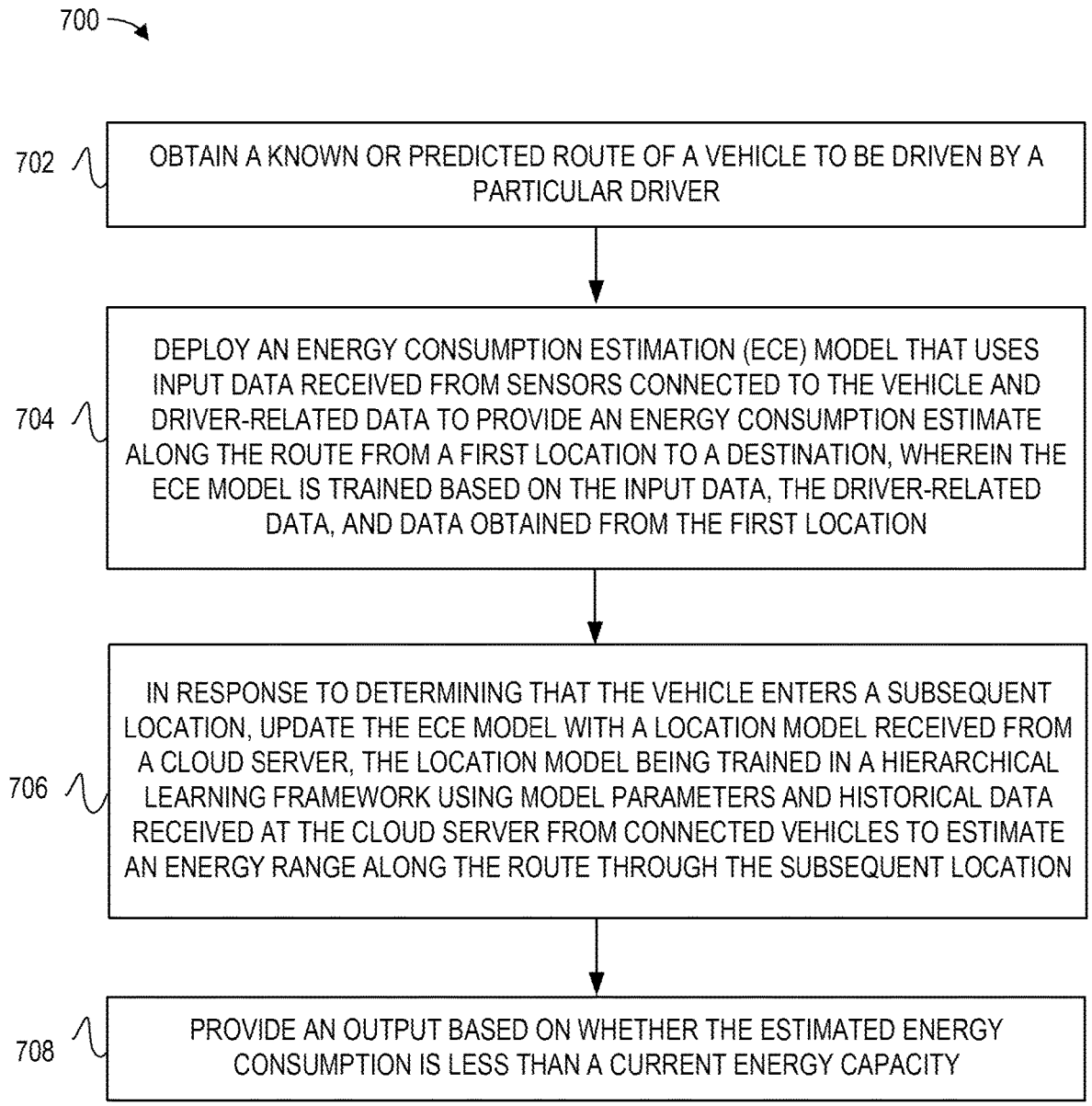
FIG. 7 illustrates a method for estimating an energy range of a vehicle according to an example embodiment.

FIG. 7 illustrates a method 700 for estimating an energy range of a vehicle according to an example embodiment. The method 700 may be performed, for example, by range estimation system 200 of FIG. 2, and more particularly by range estimation circuit 210 and energy consumption estimation client 205. The vehicle may be an electric or hybrid electric vehicle such as, for example, vehicle 100 of FIG. 1, and the vehicle may be a connected vehicle 320.

Step 702 includes obtaining a route of the vehicle 100 to be driven by a particular driver. The route may be a known route that is obtained using techniques described herein. For example, the route may be a known route that is obtained from an onboard navigation system such as GPS/VEH positioning system 272 (i.e., based on a destination that the driver has inputted into the GPS/VEH positioning system 272). The range estimation circuit 210 may communicate with the vehicle positioning system 272 (e.g., an onboard navigation platform) to determine the route of the vehicle to be driven by the particular driver. If the route to be driven by the driver cannot be obtained by the vehicle positioning system 272 then a predicted route may be obtained by energy consumption estimation client/model 205 from a prediction made based on history data of the particular driver stored in the database 209 including a common route driven by the particular driver or common/past locations frequented. A predicted route can also be obtained from hierarchical learning framework 305 (FIG. 3) of the server 310 over the network 290 based on historical driver data stored in database 315 received from connected vehicles 320, wherein the HLF 305 can access generic range estimation model 305a, location models 305b, time-based models 305c, and other models 305d.

Step 704 includes deploying an energy consumption estimation model that uses input data received from sensors connected to the vehicle 100 and driver-related data (e.g., data relating to a driving style or preferences of the particular driver) to provide an energy consumption estimate along the route from a first location to a destination, wherein the energy consumption estimation model is trained based on input data from sensors, the driver-related information, and data obtained from the first location. The data obtained from the first location may be at least one of weather data, traffic data, road or lane geometry, etc. The energy consumption estimation model may be a model implemented by energy consumption estimation client 205. The input data may be from sensors 152, 232, 252 connected to the vehicle 100. The model is trained using the input data and the driver-related data, and the model attempts to determine which inputs have the most, or at least significant, impact on energy consumption.

Step 706 includes, in response to determining that the vehicle 100 enters a subsequent location, updating the energy consumption estimation model with a location model 305b received from an edge/cloud server 310, the location model 305b being trained in a hierarchical learning framework using model parameters and historical data received at the edge/cloud server 310 from connected vehicles 320 to estimate an energy range along the route through the subsequent location. In an example embodiment the first location has been driven by the vehicle before and the subsequent location has not been driven by the vehicle before.

Step 708 includes providing an output based on whether the estimated energy consumption is less than a current energy capacity. When the estimated energy consumption is greater than (or equal to) the current energy capacity (case 1), the output is at least one of (a) a recommendation to re-route the vehicle, (b) a recommended alternate route, (c) a recommended charging station, or (d) a recommended charging time. When the estimated energy consumption is less than the current energy capacity (case 2), the output is at least one of (a) a displayed segmented energy consumption map showing the estimated energy consumption along each segment of the map along the route, (b) energy saving driving tips, or (c) the remaining SOC/range after the route is complete. When the estimated energy consumption is equal to the current energy capacity, the output may be either of case 1 or case 2 above, but preferably case 1.

Figure 8:
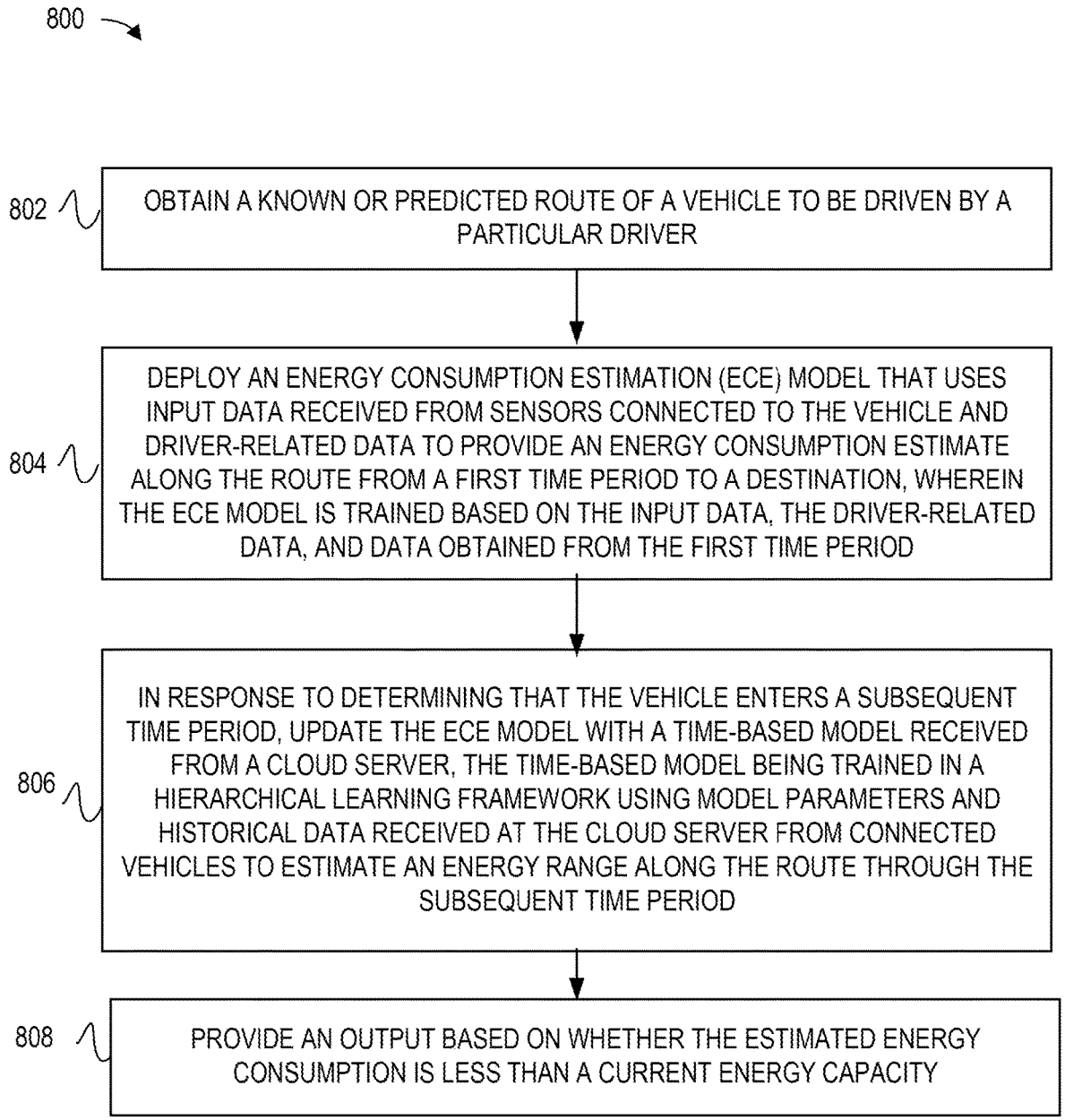
FIG. 8 illustrates a method for estimating an energy range of a vehicle according to another example embodiment.

FIG. 8 illustrates a method 800 for estimating an energy range of a vehicle according to another example embodiment. The method 800 may be performed, for example, by range estimation system 200 of FIG. 2, and more particularly by range estimation circuit 210 and energy consumption estimation client 205. The vehicle may be an electric or hybrid electric vehicle such as, for example, vehicle 100 of FIG. 1, and the vehicle may be a connected vehicle 320.

Step 802 includes obtaining a route of the vehicle to be driven by a particular driver. The route may be a known route that is obtained using techniques described herein. For example, the route may be a known route that is obtained from an onboard navigation system such as GPS/VEH positioning system 272 (i.e., based on a destination that the driver has inputted into the GPS/VEH positioning system 272). The range estimation circuit 210 may communicate with the vehicle positioning system 272 (e.g., an onboard navigation platform) to determine the route of the vehicle to be driven by the particular driver. If the route to be driven by the driver cannot be obtained by the vehicle positioning system 272 then a predicted route may be obtained by energy consumption estimation client/model 205 from a prediction made based on history data of the particular driver stored in the database 209 including a common route driven by the particular driver or common/past locations frequented. A predicted route can also be obtained from hierarchical learning framework 305 (FIG. 3) of the server 310 over the network 290 based on historical driver data stored in database 315 received from connected vehicles 320, wherein the HLF 305 can access generic range estimation model 305*a*, location models 305*b*, time-based models 305*c*, and other models 305*d*.

Step 804 includes deploying an energy consumption estimation model that uses input data received from sensors connected to the vehicle 100 and driver-related information (e.g., data relating to a driving style or preferences of the particular driver) to provide an energy consumption estimate along the route from a first time period to a destination, wherein the energy consumption estimation model is trained based on the input data, the driver-related data, and data obtained from the first time period. The energy consumption estimation model may be a model implemented by energy consumption estimation client 205. The input data may be from sensors 152, 232, 252 connected to the vehicle 100. The model is trained using the input data and the driver-related data and the model attempts to determine which inputs have the most, or at least significant, impact on energy consumption.

Step 806 includes, in response to determining that the vehicle 100 enters a subsequent time period, updating the energy consumption estimation model with a time-based model 305*c* received from an edge/cloud server 310, the time-based model 305*c* being trained in a hierarchical learning framework using model parameters and historical data received at the edge/cloud server 310 from connected vehicles 320 to estimate an energy range along the route through the subsequent time period. The predetermined time period may correspond to one of time of day, time of year, specific day, weekday, or holiday. In an example embodiment the vehicle has driven within the first time period before and the vehicle has not been driven within the subsequent time period before.

Figure 9:
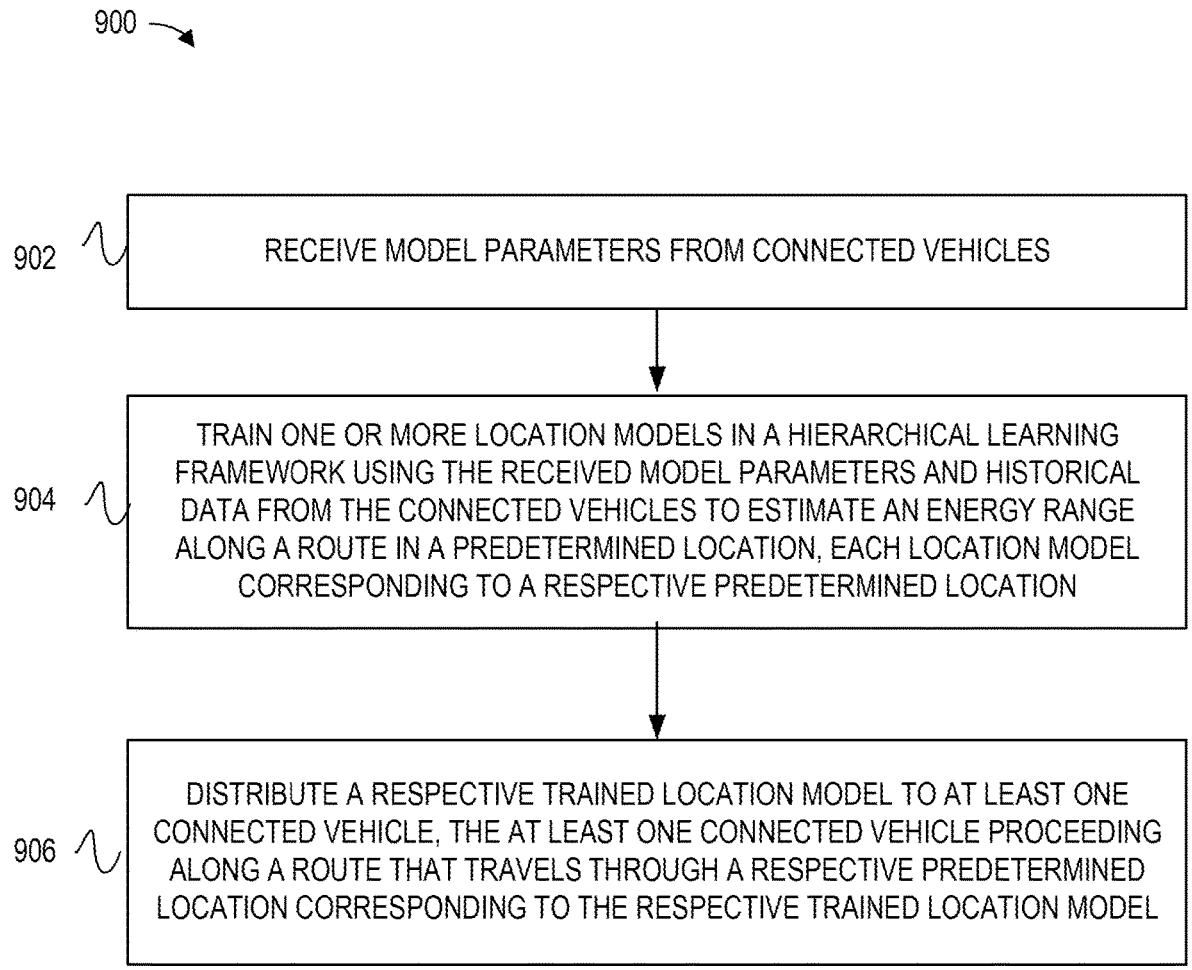
FIG. 9 illustrates a method for estimating the energy range of connected vehicles according to another example embodiment.

Step 808 includes providing an output based on whether the estimated energy consumption is less than a current energy capacity. When the estimated energy consumption is greater than the current energy capacity (case 1), the output is at least one of (a) a recommendation to re-route the vehicle, (b) a recommended alternate route, (c) a recommended charging station, or (d) a recommended charging time. When the estimated energy consumption is less than the current energy capacity (case 2), the output is at least one of (a) a displayed segmented energy consumption map showing the estimated energy consumption along each segment of the map along the route, (b) energy saving driving tips, or (c) the remaining SOC/range after the route is complete. When the estimated energy consumption is equal to the current energy capacity, the output may be either of case 1 or case two above FIG. 9 illustrates a method 900 for estimating the energy range of connected vehicles according to another example embodiment. The method 900 may be performed, for example, by the edge/cloud server 310 of FIG. 3, and more particularly by the HLF system 305. The edge/cloud server 310 may include a communication circuit such as communication circuit 301, configured to exchange communications between the edge/cloud server 310 and connected vehicles 320, a memory storing instructions, and one or more processors communicably coupled to the memory and configured to execute the instructions to perform the method. The vehicle may be an electric or hybrid electric vehicle such as, for example, vehicle 100 of FIG. 1, which may be a connected vehicle 320.

Step 902 includes receiving model parameters from the connected vehicles 320 (the model parameters may be stored in database 315). Step 904 includes training one or more location models 305*b* in a hierarchical learning framework using the received model parameters and historical data (which may also be stored in database 315) from the connected vehicles 320 to estimate an energy range along a route in a predetermined location, each location model 305*b* corresponding to a respective predetermined location. The route may be a known or predicted route. The predetermined location may be one of city, state, geographical region, or area code. Step 906 includes distributing a respective trained location model 305*b* to at least one connected vehicle 320, the at least one connected vehicle 320 proceeding along a route that travels through a respective predetermined location corresponding to the respective trained location model 305*b*.

Figure 10:
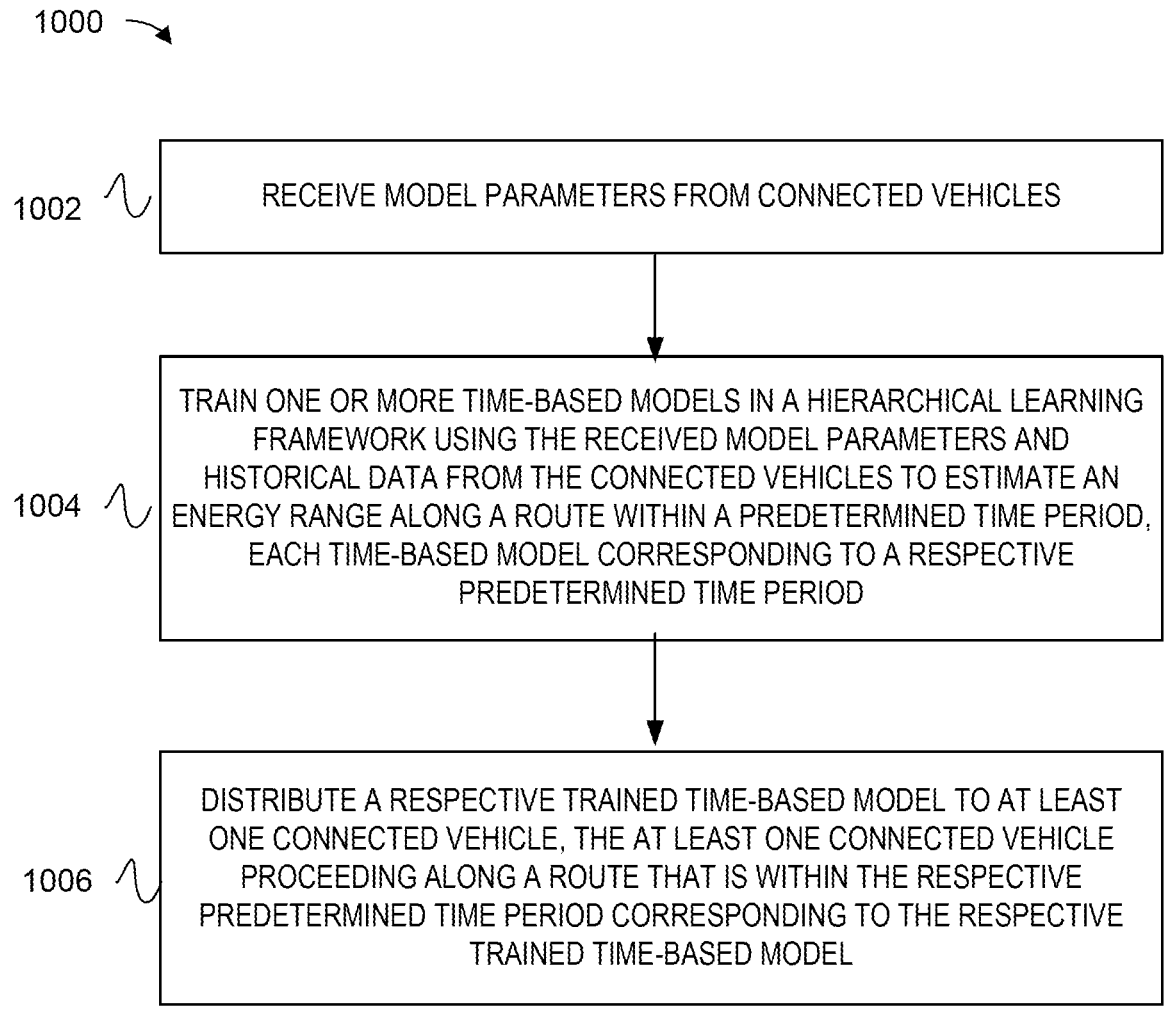
FIG. 10 illustrates a method for estimating the energy range of connected vehicles according to another example embodiment.

FIG. 10 illustrates a method 1000 for estimating the energy range of connected vehicles according to another example embodiment. The method 1000 may be performed, for example, by the edge/cloud server 310 of FIG. 3, and more particularly by the HLF system 305. The edge/cloud server may include a communication circuit such as communication circuit 301, configured to exchange communications between the edge/cloud server 310 and connected vehicles 320, a memory storing instructions, and one or more processors communicably coupled to the memory and configured to execute the instructions to perform the method. The vehicle may be an electric or hybrid electric vehicle such as, for example, vehicle 100 of FIG. 1.

Step 1002 includes receiving model parameters from the connected vehicles 320 (the model parameters may be stored in database 315). Step 1004 includes training one or more time-based models 305*c* in a hierarchical learning framework using the received model parameters and historical data (which may also be stored in database 315) from the connected vehicles 320 to estimate an energy range along a route that is within a predetermined time period, each time-based model 305*c* corresponding to a respective predetermined time period. The route may be a known or predicted route. The predetermined time period may correspond to one of time of day, time of year, specific day, weekday, or holiday.

Step 1006 includes distributing a respective trained time-based model 305*c* to at least one connected vehicle 320, the at least one connected vehicle 320 proceeding along a route that is within the respective predetermined time period corresponding to the respective trained time-based model 305*c*.

Figure 11:
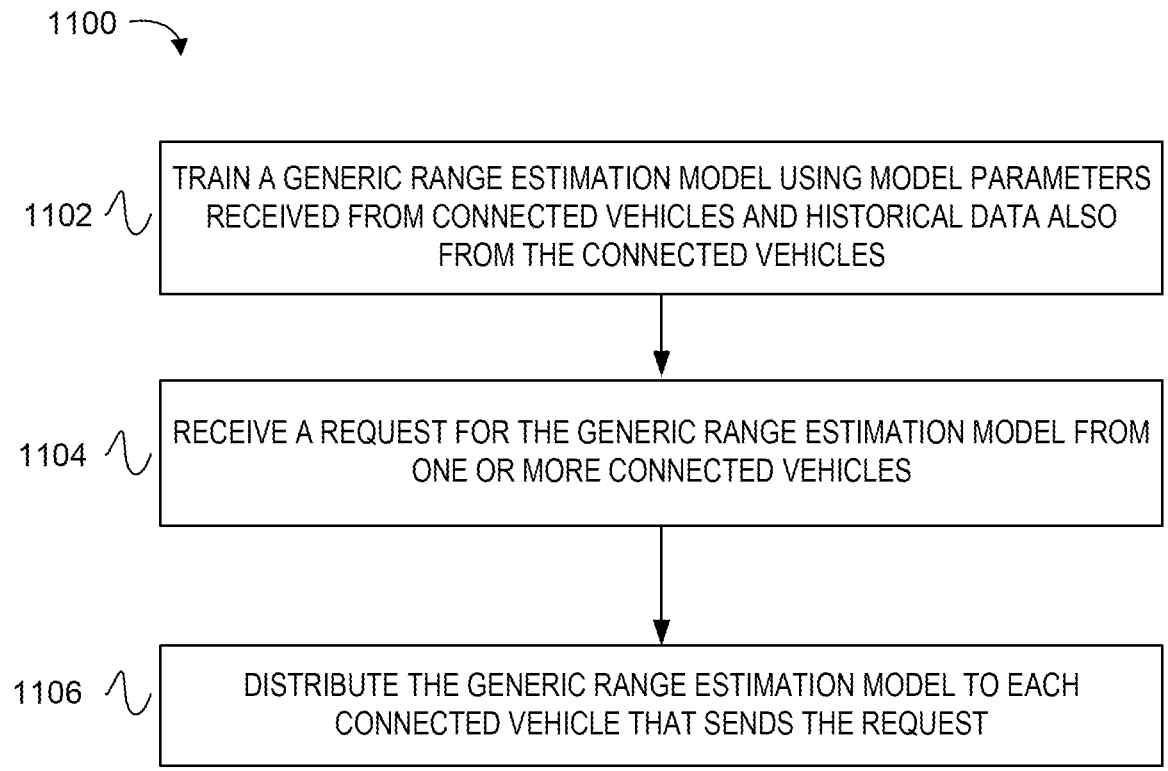
FIG. 11 illustrates a method for estimating the energy range of connected vehicles according to another example embodiment.

FIG. 11 illustrates a method 1100 for estimating the energy range of connected vehicles according to another example embodiment. The method 1100 may be performed, for example, by the edge/cloud server 310 of FIG. 3, and more particularly by the HLF system 305. The edge/cloud server 310 may include a communication circuit such as communication circuit 301, configured to exchange communications between the edge/cloud server 310 and connected vehicles 320, a memory storing instructions, and one or more processors communicably coupled to the memory and configured to execute the instructions to perform the method. The vehicle may be an electric or hybrid electric vehicle such as, for example, vehicle 100 of FIG. 1.

Step 1102 includes training a generic range estimation model 305a using model parameters received from the connected vehicles 320 (and in some embodiments historical data also from the connected vehicles 320). The model parameters and historical data may be stored in database 315. Step 1104 includes receiving a request for the generic range estimation model 305a from one or more connected vehicles 320. Step 1106 includes distributing the generic range estimation model 305a to each connected vehicle 320 that sends the request. The connected vehicles 320 may be a new vehicle that has not been driven before, or a vehicle that has not been driven by this driver before.

Figure 13:
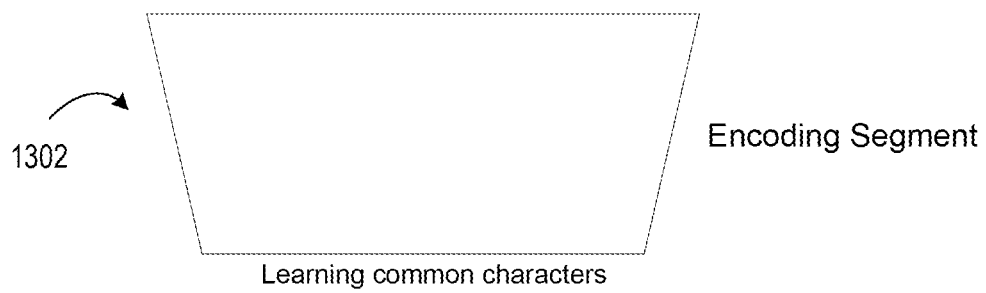
FIG. 13 shows an example deep neural network that uses segmentation and semantic meaning, in accordance with some embodiments disclosed herein.
Figure 13:
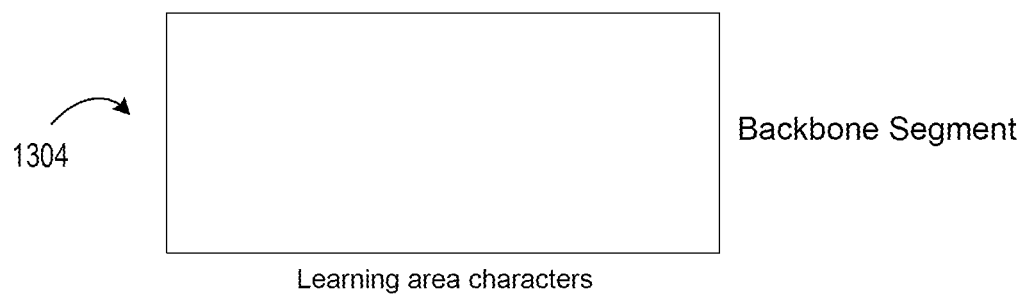
Figure 13:
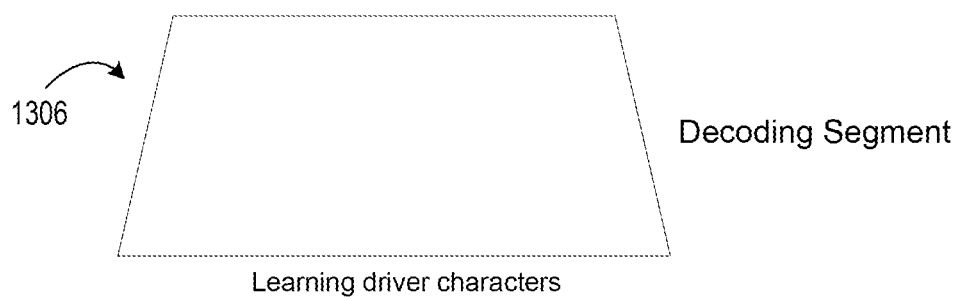

Example embodiments of the hierarchical learning framework (HLF) system 305 of FIG. 3 is described as follows in connection with FIGS. 13-14. It is of course to be understood that the description of the HLF system 305 is not limited to the example embodiments described herein. For example, the HLF system 305 is not limited to a deep learning network, a general neural network, a recurrent neural network, a convolutional neural network, a mixed structure, or any specific type of network or machine learning model.

Moreover, in example embodiments the HLF system 305 is implemented in a cloud/edge server such as cloud/edge server 310. In example embodiments or implementations the HLF system 305 is a multi-level framework and may or may not solely reside on one single cloud server, or edge server, or user vehicle; the HLF system 305 may reside on one or more or all of these. As an example, if one user's vehicle 320 connects to a cloud/edge server, then the vehicle 320 becomes part of the HLF system 305. The HLF system 305 can thereby help customize to this *particular* driver's style by first downloading a generalized model and then customizing using this driver's own data. Example embodiments can move one level up and have for example one edge server and all vehicles in a location (e.g., San Francisco) are connected to this server. Then in this example the HLF 305 customizes based on *general* driver styles from all drivers in San Francisco. Example embodiments can move up further, assuming all edge servers in each city of California (not just San Francisco) connect to one cloud server; this server, again, can generate a customized model based on all cities in California. It is of course to be understood that these are just examples and other embodiments or implementations are within the scope of this disclosure.

The HLF system 305 estimates energy consumption or range such as from model parameters and historical data of connected vehicles 320 stored in database 315 of the edge/cloud server 310 of FIG. 3, or based on location, or based on time period, etc. FIG. 13 shows an example deep neural network 1300 that uses segmentation and semantic meaning, for personalized applications and its learned semantic meanings in different segments. The hypothesis is that different layers/segments are responsible for learning different semantic meanings, and that parameters of different layers/segments can be aggregated at different level servers. Three segments are assumed in this example: encoding segment 1302 in which common characteristics are learned; backbone segment 1304 in which area characteristics are learned; and decoding segment 1306 in which driver characteristics are learned. These characteristics can be stored in database 315.

Model parameters are aggregated at different level servers. A full model is deployed and trained/fine-tuned at local (e.g., at vehicle/edge server), and parameters of different model segments are aggregated at different levels of servers. At a lowest level server, all model parameters are aggregated. At a middle level server, parameters of the backbone segment 1304 and the encoding segment 1302 are aggregated. At a highest level server: only parameters of the encoding segment 1302 are aggregated. In general, a higher-level server will learn more general knowledge of the task. Model parameter aggregation can happen at different frequencies. Each server can manage multiple models; an updated model distributed by a higher-level server can also be managed by the server itself. Only model parameters are transmitted between servers.

Figure 14:
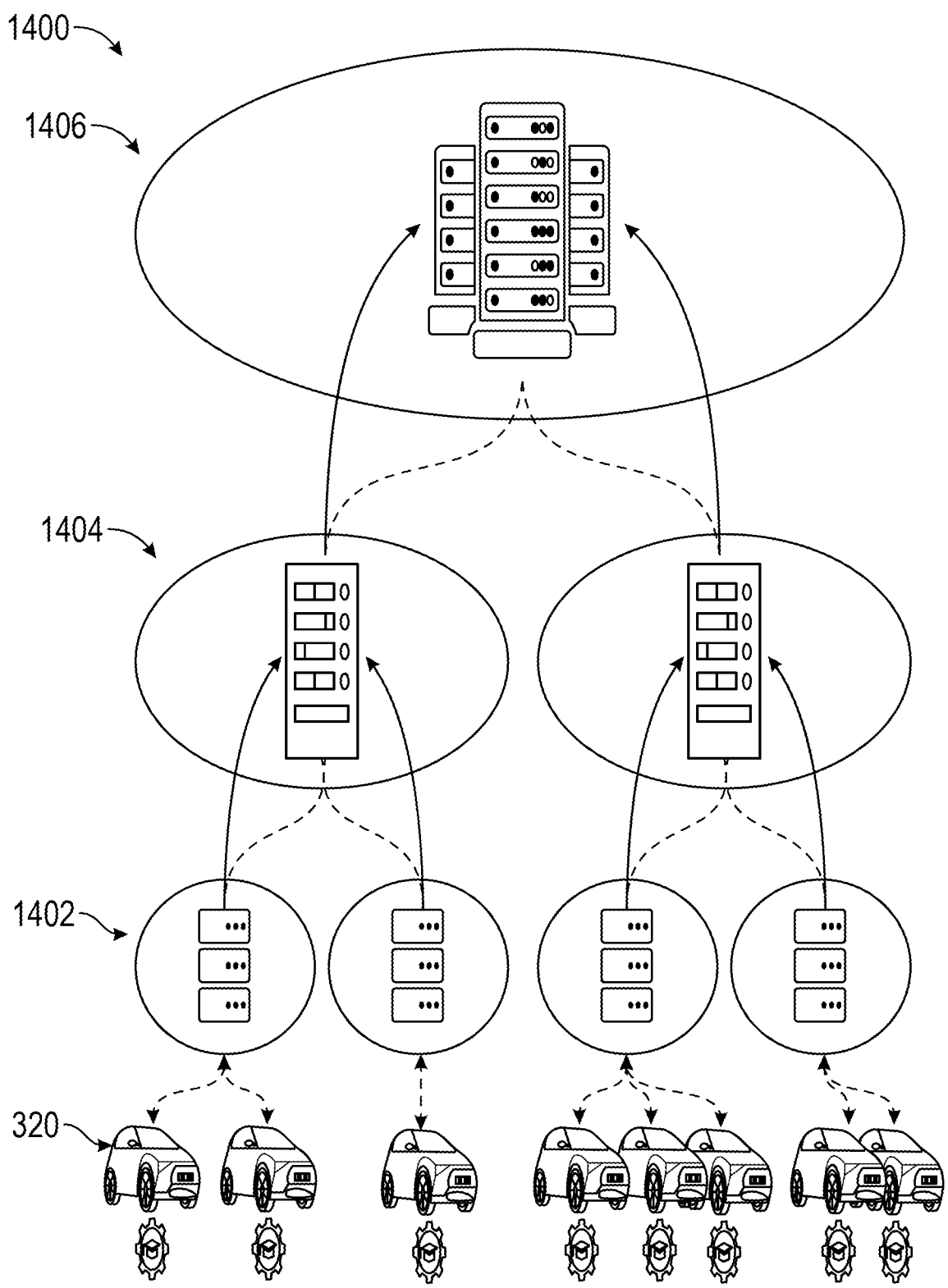
FIG. 14 shows an example of a framework including its flow of hierarchical learning communicating with connected vehicles that transmit data such as model parameters to servers in the framework, in accordance with some embodiments disclosed herein.

FIG. 14 shows an example of a framework 1400 including its flow of hierarchical learning in which connected vehicles 320 transmit data such as model parameters to a plurality of lowest level servers 1402. The task(s) of the lowest level servers 1402 include learning driver behaviors from the model parameters of the connected vehicles 320. The task(s) of the middle-level servers 1404 include learning regional trends (such as location or area, e.g., a city, state, location covered by an area code, etc.). The task(s) of the highest-level servers 1406 include learning basic features. As examples, "basic features," using the electric vehicle energy estimation as an example, "basic features" could be, e.g., "ambient temperature will largely affect range"; "regional trends" could be, e.g., "energy consumption will be high in this specific region because of terrain or because there is always traffic congestion"; "driver behavior" could be, e.g., "an aggressive driver may consume more energy." It is of course to be understood that these are merely examples and the disclosed technology is not limited thereto.

In an example embodiment of this multi-level server infrastructure each level covers different scales of various regions. If a model has already deployed on the vehicle 100 (such as an energy consumption estimation model of energy consumption estimation client 205, generic range estimation model 305a, location model 305b, time-based model 305c, or other models 305d), the model can be updated/fine-tuned when new data is observed by the vehicle 100 in daily life. The model is updated from the bottom up: a low-level server uploads model parameters to a higher-level server. Only model parameters are transmitted, and the raw data stays in the vehicle 100.

After receiving the model parameters, the server at whichever level combines the model parameters and obtains an updated model. For example a model obtained in a different region server can reflect that region's characteristics. This process can be repeated until an updated model reaches a highest-level server. Accordingly a general or generic range estimation model 305c, or a location model 305b for example, can be obtained for future model distribution to connected vehicles 320.

By virtue of only model parameters being transmitted from a connected vehicle 320 to a low-level server, a driver's privacy data does not leave their vehicle, and the cloud will not have their driving information, thereby increasing security of private information. Furthermore, model parameters in each vehicle can be uploaded to servers in the HLF system 305 on the cloud/edge server 310, where a generic range estimation model 305a can be aggregated for future use such as distributing the model to new vehicles joining the system or otherwise to connected vehicles.

In examples, new or updated model distribution to a connected vehicle 320 follows a top-down flow. For existing lower-level servers or vehicles, a higher-level server distributes new model parameters to a connected vehicle 320. A new or updated model may not necessarily have better performance than the older model on the connected vehicle 320 being updated because the older model may be adapted to the existing driver or region (location/area). The edge/cloud server 310 manages different models (e.g., models 305*a-d*). An existing model in a vehicle 320 can be updated in real time.

For newly joined servers or vehicles 320 (e.g., a vehicle entering a new region/location/area), a higher-level server distributes new model parameters. A new model can be combined with an existing model, so that the model is updated/customized to both the driver and region characteristics.

As another example, if a person in San Francisco buys a new car, he or she does not have any of his or her own driving data to collect. However, a location model 305*b* can be downloaded that is adapted to San Francisco and that can be used as a starting point for the person's vehicle 100; the person can now collect his or her own data to add to the range or energy consumption estimation model onboard the vehicle (e.g., in range estimation circuit 210 or energy consumption estimation client 205).

Accordingly, by virtue of the features of the present disclosure, technical solutions can be realized, including but not limited to the following. The HLF system 305 can be customized in that a model deployed on each vehicle 320 can be adapted to each region or current time or driver's preference. The HLF system 305 can be distributed: the process happens in a distributed way, and scale up is relatively easy. The HLF system 305 can reduce data transmission: by design, only model parameters are transmitted from connected vehicles 320, and therefore unnecessary raw data transmission can be avoided. The HLF system 305 can be privacy preserving: a user's sensitive data stays in their vehicle 320, and is not shared with others (though in some examples users could give permission to share privacy data). Moreover. the size of the database maintained in the cloud can be reduced.

The present disclosure describes in an example embodiment a system that leverages a hierarchical learning framework to enable range or energy consumption estimation model customizability to thereby improve range or energy consumption estimation accuracy. A range or energy consumption estimation model deployed on each vehicle can be customized to its driver's driving style and common driving locations. If the vehicle is driving to another location, the sever can update the model with a model that is better suited for the new location via an over-the-air update. Accordingly a range or energy consumption estimation model deployed on each vehicle can be replaced or updated by a generic range estimation model, a location model, a time-based model, or others.

Figure 15:
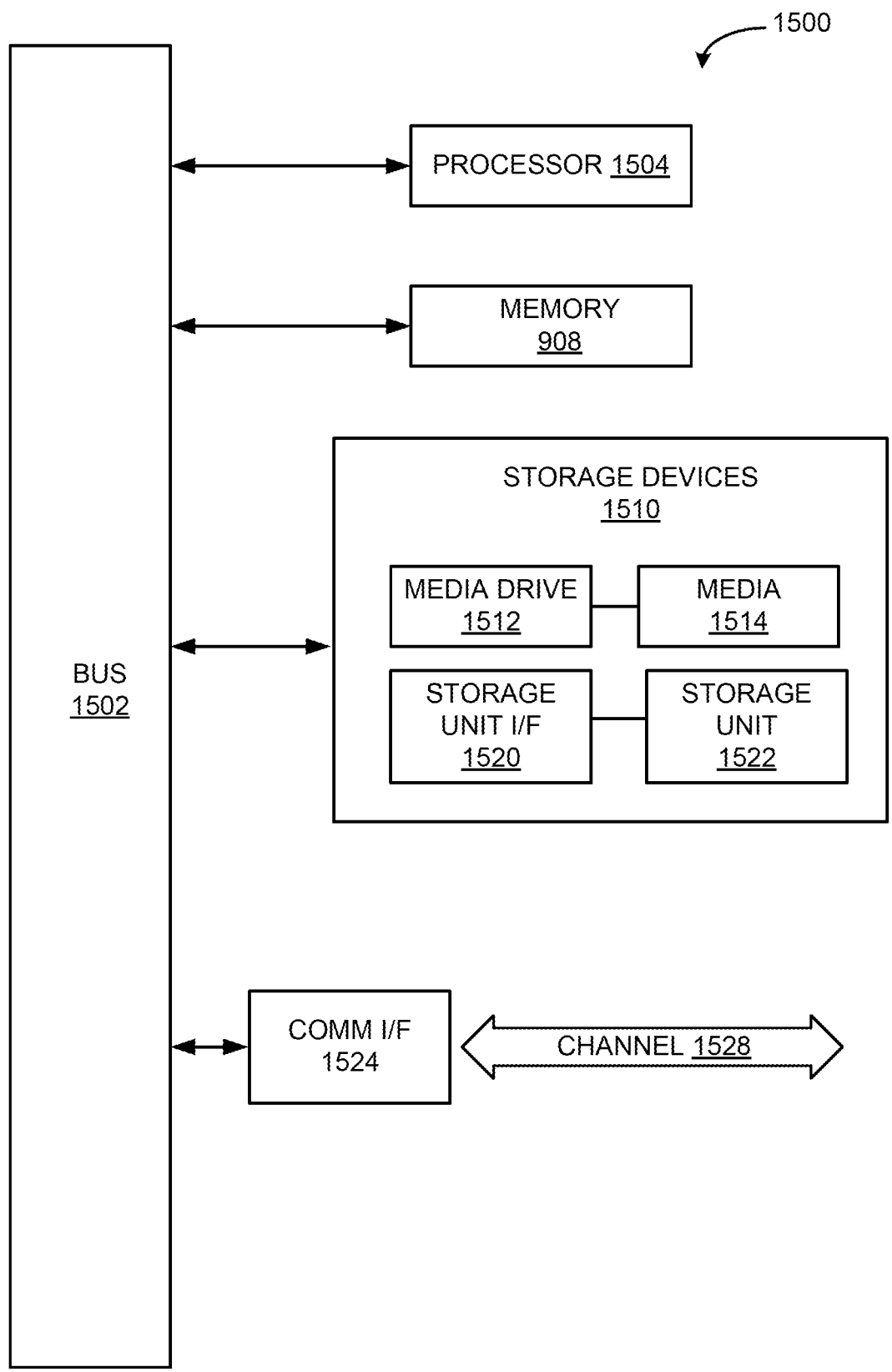
FIG. 15 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 15. Various embodiments are described in terms of this example-computing component 900. After reading this description, it will become apparent to a person skilled in the relevant art how to implement the application using other computing components or architectures.

Referring now to FIG. 15, computing component 1500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 1500 might also represent computing capabilities embedded within or otherwise available to a given device. For example, a computing component might be found in other electronic devices such as, for example, portable computing devices, and other electronic devices that might include some form of processing capability.

Computing component 1500 might include, for example, one or more processors, controllers, control components, or other processing devices. This can include a processor, and/or any one or more of the components making up range estimation system 200 of FIG. 2 and/or server 310 of FIG. 3. Processor 1504 might be implemented using a general-purpose or special-purpose processing engine such as, for example, a microprocessor, controller, or other control logic. Processor 1504 may be connected to a bus 1502. However, any communication medium can be used to facilitate interaction with other components of computing component 1500 or to communicate externally.

Computing component 1500 might also include one or more memory components, simply referred to herein as main memory 1508. For example, random access memory (RAM) or other dynamic memory, might be used for storing information and instructions to be executed by processor 1504. Main memory 1508 might also be used for storing temporary variables or other intermediate information during execution of instructions to be executed by processor 1504. Computing component 1500 might likewise include a read only memory ("ROM") or other static storage device coupled to bus 1502 for storing static information and instructions for processor 1504.

The computing component 1500 might also include one or more various forms of information storage mechanism 1510, which might include, for example, a media drive 1512 and a storage unit interface 1520. The media drive 1512 might include a drive or other mechanism to support fixed or removable storage media 1514. For example, a hard disk drive, a solid-state drive, a magnetic tape drive, an optical drive, a compact disc (CD) or digital video disc (DVD) drive (R or RW), or other removable or fixed media drive might be provided. Storage media 1514 might include, for example, a hard disk, an integrated circuit assembly, magnetic tape, cartridge, optical disk, a CD or DVD. Storage media 1514 may be any other fixed or removable medium that is read by, written to or accessed by media drive 1512. As these examples illustrate, the storage media 1514 can include a computer usable storage medium having stored therein computer software or data.

In alternative embodiments, information storage mechanism 1510 might include other similar instrumentalities for allowing computer programs or other instructions or data to be loaded into computing component 1500. Such instrumentalities might include, for example, a fixed or removable storage unit 1522 and an interface 1520. Examples of such storage units 1522 and interfaces 1520 can include a program cartridge and cartridge interface, a removable memory (for example, a flash memory or other removable memory component) and memory slot. Other examples may include a PCMCIA slot and card, and other fixed or removable storage units 1522 and interfaces 150 that allow software and data to be transferred from storage unit 1522 to computing component 1500.

Computing component 1500 might also include a communications interface 1524. Communications interface 1524 might be used to allow software and data to be transferred between computing component 1500 and external devices. Examples of communications interface 1524 might include a modem or soft modem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 1524 may be carried on signals, which can be electronic, electromagnetic (which includes optical) or other signals capable of being exchanged by a given communications interface 1524. These signals might be provided to communications interface 1524 via a channel 1528. Channel 1528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 1508, storage unit 1520, media 1514, and channel 1528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 1500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for estimating an energy range of a vehicle, comprising:
   a memory storing instructions;
   a hierarchy of edge/cloud servers, wherein the hierarchy of edge/cloud servers comprises:
      a first level of servers configured to obtain first parameters associated with one or more driver behaviors shared among a first location and one or more different locations; and
      a second level of servers configured to obtain second parameters unique to the first location and the one or more different locations; and
   one or more processors communicably coupled to the memory and configured to execute the instructions to:
      obtain a route of the vehicle;
      deploy an energy consumption estimation model, based on a first subset of the first parameters obtained from the first level of servers, to provide an energy consumption estimate along the route from the first location to a destination;
      in response to determining that the vehicle enters a subsequent location, update the energy consumption estimation model with a location model based on a second subset of the second parameters received from the second level of servers, to estimate an energy range along the route through the subsequent location; and provide an output based on whether the estimated energy consumption is less than a current energy capacity.

2. The system of claim 1, wherein
the route of the vehicle is to be driven by a particular driver,
the energy consumption estimation model uses (a) input data received from sensors connected to the vehicle and (b) driver-specific data relating to a driving style of the particular driver to provide the energy consumption estimate,
the energy consumption estimation model is trained based on the input data and the driver-specific data, and
the location model is trained in a hierarchical learning framework using model parameters and historical data received at the edge/cloud servers from connected vehicles.

3. The system of claim 2, wherein the driving style of the particular driver includes at least one of a common driving location, route, time, speed, or acceleration of the particular driver.

4. The system of claim 1, wherein the first location has been driven by the vehicle before and the subsequent location has not been driven by the vehicle before.

5. The system of claim 2, wherein the one or more processors are further configured to execute the instructions to:
receive a generic range estimation model from the edge/cloud servers, the generic range estimation model being trained using model parameters received from the connected vehicles; and
send model parameters pertaining to the vehicle to the generic range estimation model implemented in the edge/cloud servers.

6. The system of claim 1, wherein the route of the vehicle is obtained from an onboard navigation platform or from a prediction made based on history data of a particular driver including a common route driven by the particular driver.

7. The system of claim 1, wherein
when the estimated energy consumption is greater than or equal to the current energy capacity, the output is at least one of (a) a recommendation to re-route the vehicle, (b) a recommended alternate route, (c) a recommended charging station, or (d) a recommended charging time; or
when the estimated energy consumption is less than the current energy capacity, the output is at least one of (a) a displayed segmented energy consumption map showing the estimated energy consumption along each segment of the map along the route, (b) energy saving driving tips, or (c) a remaining state of charge (SOC)/range after the route is complete.

8. The system of claim 1, wherein the second set of servers is configured to obtain the second parameters from one or more first vehicles at the first location and one or more second vehicles at the subsequent location and to fine-tune the second parameters.

9. The system of claim 7, wherein when the estimated energy consumption is less than the current energy capacity, the output comprises the displayed segmented energy consumption map.

10. A method for estimating an energy range of a vehicle, comprising:
obtaining a route of the vehicle;
obtaining parameters from a hierarchy of edge/cloud servers, wherein the hierarchy of edge/cloud servers comprises:
a first level of servers configured to obtain first parameters associated with one or more driver behaviors shared among a first location and one or more different locations; and
a second level of servers configured to obtain second parameters unique to the first location and the one or more different locations;
deploying an energy consumption estimation model, based on a first subset of the first parameters obtained from the first level of servers, to provide an energy consumption estimate along the route from within a first time period to a destination;
in response to determining that the vehicle enters a subsequent time period, updating the energy consumption estimation model with a location model based on a second subset of the second parameters received from the second level of servers, to estimate an energy range along the route within the subsequent time period; and
providing an output based on whether the estimated energy consumption is less than a current energy capacity.

11. The method of claim 10, wherein
the route of the vehicle is to be driven by a particular driver,
the energy consumption model uses (a) input data received from sensors connected to the vehicle and (b) driver-specific data relating to a driving style of the particular driver to provide the energy consumption estimate,
the energy consumption estimation model is trained based on the input data and the driver-specific data, and
the location model is trained in a hierarchical learning framework using model parameters and historical data received at the edge/cloud servers from connected vehicles.

12. The method of claim 10, wherein the vehicle has driven within the first time period before and the vehicle has not been driven within the subsequent time period before.

13. The method of claim 11, further comprising:
receiving a generic range estimation model from the edge/cloud servers, the generic range estimation model being trained using model parameters received from the connected vehicles; and
sending model parameters pertaining to the vehicle to the generic range estimation model implemented in the edge/cloud servers.

14. The method of claim 10, wherein the route of the vehicle is obtained from an onboard navigation platform or from a prediction made based on history data of a particular driver including a common route driven by the particular driver.

15. The method of claim 10, wherein
when the estimated energy consumption is greater than or equal to the current energy capacity, the output is at least one of (a) a recommendation to re-route the vehicle, (b) a recommended alternate route, (c) a recommended charging station, or (d) a recommended charging time; or
when the estimated energy consumption is less than the current energy capacity, the output is at least one of (a) a displayed segmented energy consumption map showing the estimated energy consumption along each segment of the map along the route, (b) energy saving driving tips, or (c) a remaining state of charge (SOC)/range after the route is complete.

16. A system implemented in a hierarchy of edge/cloud servers for energy range estimation of connected vehicles, the system comprising:
a memory storing instructions; and
one or more processors communicably coupled to the memory and configured to execute the instructions to:
receive model parameters from the connected vehicles, wherein receiving the model parameters further comprises:
receiving, at a first level of servers, first parameters associated with one or more driver behaviors shared among a first location and one or more different locations and receiving, at a second level of servers, second parameters unique to the first location and the one or more different locations;
train one or more location models in a hierarchical learning framework using the received model parameters and historical data from the connected vehicles to estimate an energy range along a route in a predetermined location, each location model corresponding to a respective predetermined location and stored within the second level of servers; and
distribute a respective trained location model to at least one connected vehicle, the at least one connected vehicle proceeding along a route that travels through a respective predetermined location corresponding to the respective trained location model.

17. The system of claim 16, wherein the route is a known or predicted route.

18. The system of claim 16, wherein the predetermined location is one of city, state, geographical region, or area code.

19. The system of claim 16, wherein the one or more processors execute further instructions to:
train a generic range estimation model using the received model parameters from the connected vehicles;
receive a request for the generic range estimation model from one or more connected vehicles; and
distribute the generic range estimation model to each connected vehicle that sends the request.

20. The system of claim 16, wherein the one or more processors execute further instructions to:
train one or more time-based models in a hierarchical learning framework using the received model parameters and historical data from the connected vehicles to estimate an energy range along a route that is within a predetermined time period, each time-based model corresponding to a respective predetermined time period; and
distribute a respective trained time-based model to at least one connected vehicle, the at least one connected vehicle proceeding along a known or predicted route that is within the respective predetermined time period corresponding to the respective trained time-based model.

* * * * *